(12) United States Patent
Ohkawa

(10) Patent No.: US 7,426,300 B2
(45) Date of Patent: Sep. 16, 2008

(54) IMAGE PROCESSING APPARATUS, IMAGE PROCESSING METHOD, PROGRAM AND IMAGE FORMING APPARATUS, FOR PERFORMING DENSITY ADJUSTMENT ON AN IMAGE BASED ON A HIGHLIGHT PART AND A SHADOW PART OF A HISTOGRAM OF THE IMAGE

(75) Inventor: Mieko Ohkawa, Hachioji (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 696 days.

(21) Appl. No.: 10/851,545

(22) Filed: May 21, 2004

(65) Prior Publication Data

US 2005/0013484 A1    Jan. 20, 2005

(30) Foreign Application Priority Data

Jul. 15, 2003    (JP)    ............................. 2003-197114

(51) Int. Cl.
*G06K 9/00*    (2006.01)
*G06K 9/40*    (2006.01)
(52) U.S. Cl. ...................................... 382/169; 382/274
(58) Field of Classification Search ........................ None
See application file for complete search history.

(56) References Cited

U.S. PATENT DOCUMENTS

| | | | | |
|---|---|---|---|---|
| 5,123,060 A | * | 6/1992 | Cho et al. .................... | 382/274 |
| 5,748,773 A | * | 5/1998 | Tashiro et al. ................ | 382/169 |
| 6,043,900 A | * | 3/2000 | Feng et al. ................... | 358/1.9 |
| 6,151,410 A | * | 11/2000 | Kuwata et al. ............... | 382/167 |
| 6,608,926 B1 | * | 8/2003 | Suwa et al. .................. | 382/162 |
| 6,694,051 B1 | * | 2/2004 | Yamazoe et al. ............. | 382/167 |

(Continued)

FOREIGN PATENT DOCUMENTS

JP    11-196275 A    7/1999

(Continued)

OTHER PUBLICATIONS

A Japanese Office Action (and English translation thereof) Dated Apr. 30, 2008, issued in a counterpart Japanese Application.

*Primary Examiner*—Bhavesh Mehta
*Assistant Examiner*—Yuzhen Ge
(74) *Attorney, Agent, or Firm*—Frishauf, Holtz, Goodman & Chick, P.C.

(57) ABSTRACT

The present invention relates to a technique implementing a density adjustment fitted to an image, concretely, an image processing apparatus for (1) judging the kind of a read image with a high accuracy, and (2) producing an arbitrary γ curve. The apparatus includes: a histogram calculation section for calculating a histogram of an image; a highlight part detection section for detecting a highlight part from the histogram; a shadow part detection section for detecting a shadow part from the histogram; a γ curve production section for producing a γ curve by using γ values corresponding to each of the highlight part and the shadow part, both obtained on detection results of the highlight part detection section and the shadow part detection section, respectively; and a density adjustment section for performing a density adjustment of an image on the γ curve produced by the γ curve production section.

12 Claims, 14 Drawing Sheets

U.S. PATENT DOCUMENTS

| | | |
|---|---|---|
| 7,016,534 B2 * | 3/2006 | Fukawa et al. ............... 382/168 |
| 7,167,597 B2 * | 1/2007 | Matsushima ................ 382/274 |
| 2003/0043410 A1 | 3/2003 | Fukawa et al. |
| 2003/0174886 A1 * | 9/2003 | Iguchi et al. ................ 382/167 |

FOREIGN PATENT DOCUMENTS

| | | |
|---|---|---|
| JP | 11-196276 A | 7/1999 |
| JP | 2000-215306 A | 8/2000 |
| JP | 2003-051938 A | 8/2001 |
| JP | 2003-051944 A | 2/2003 |

\* cited by examiner

FIG.2

200 INITIAL VALUE TABLE

| PARAMETER | VALUE |
|---|---|
| SHADOW PART THRESHOLD VALUE | 100 |
| FOOT VALUE DETECTION THRESHOLD VALUE | 2/3 |
| BACKGROUND RATE THRESHOLD VALUE | 0.3 |
| CONTINUOUS GRADATION DETECTION THRESHOLD VALUE | 110 |
| TRUE BACKGROUND THRESHOLD VALUE | 0.5 |
| JUDGMENT RATE THRESHOLD VALUE | 0.3 |
| GRADATION POSSIBILITY THRESHOLD VALUE | 35 |

FIG.4A

302 PARAMETER STORAGE AREA

| VARIABLE | VALUE |
|---|---|
| STORED DENSITY VALUE | 0 |
| COLOR/MONOCHROME SELECTION VALUE | COLOR |
| KIND OF IMAGE | PHOTOGRAPH |

FIG.4B

306 SHADOW PART STORAGE AREA

| VARIABLE | VALUE |
|---|---|
| START POINT | 0 |
| PEAK VALUE | 20 |
| FOOT VALUE | 72 |
| γ SHADOW PRODUCTION VALUE | 20 |

FIG.4C

308 HIGHLIGHT PART STORAGE AREA

| VARIABLE | CREST VALUE | | |
|---|---|---|---|
| | FIRST CREST | SECOND CREST | ... |
| START POINT | 240 | — | ... |
| PEAK VALUE | 230 | — | ... |
| FOOT VALUE | 210 | — | ... |
| γ HIGHLIGHT PRODUCTION VALUE | 230 | | |

FIG.12A
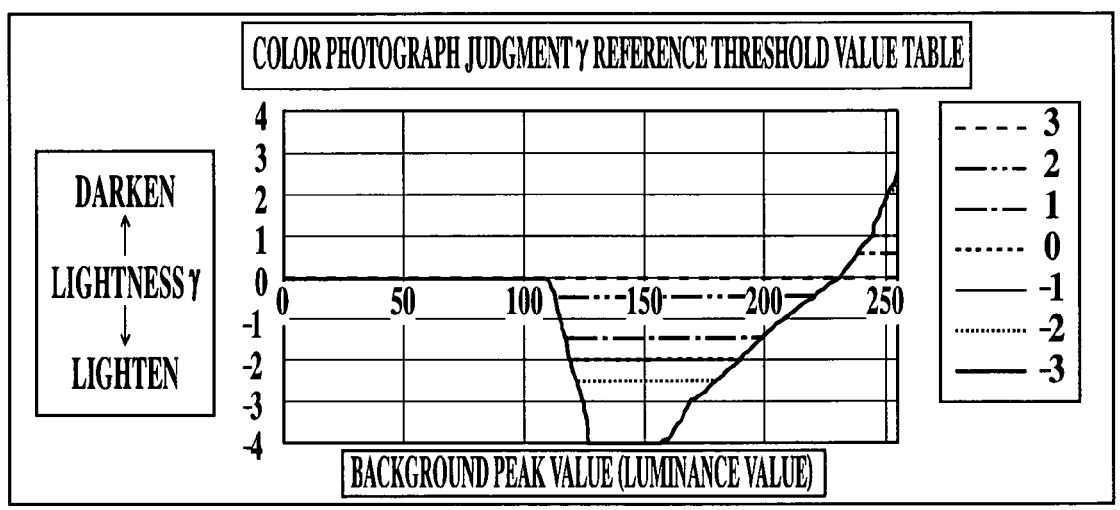
FIG.12B
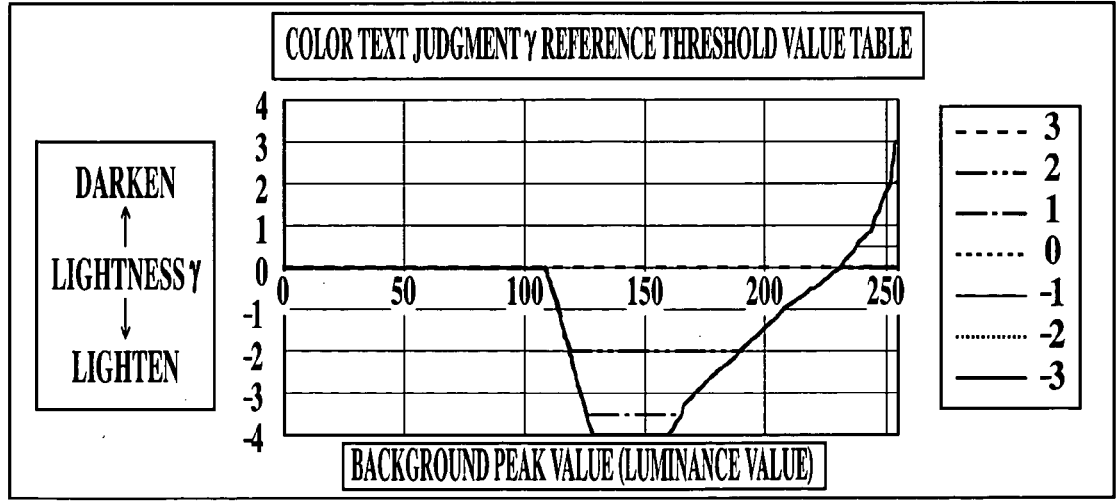
FIG.12C

IMAGE PROCESSING APPARATUS, IMAGE PROCESSING METHOD, PROGRAM AND IMAGE FORMING APPARATUS, FOR PERFORMING DENSITY ADJUSTMENT ON AN IMAGE BASED ON A HIGHLIGHT PART AND A SHADOW PART OF A HISTOGRAM OF THE IMAGE

BACKGROUND OF THE INVENTION

1. Field of the Invention

The present invention relates to an image processing apparatus, an image processing method, a program and an image forming apparatus for performing a density adjustment of an image automatically.

2. Description of Related Art

An image processing apparatus to adjust the density of a read image and to output the adjusted image as an image for image formation is known as an image processing apparatus to be built in an image forming apparatus such as a copying machine. When a kind (such as a "photograph" or a "letter") of an image is selected and the image is read, the conventional image processing apparatus built in an image forming apparatus performs a density adjustment of the read image in accordance with a $\gamma$ curve corresponding to the selected kind of the image.

For example, the following image processing apparatus is known. That is, the image processing apparatus produces a histogram of density frequencies on a read image. Then, the image processing apparatus (1) detects a highlight part by detecting the values pertaining to a foot value, a peak value and a start point (hereinafter these values will be collectively referred to as "highlight part specification information") of a high luminance part of the produced histogram, or (2) detects a shadow part by detecting the values pertaining to a foot value, a peak value and a start point (hereinafter these values will be collectively referred to as "shadow part specification information") of a low luminance part of the histogram, on a basis of the produced histogram and the selected kind of the image. Then, the image processing apparatus reads a $\gamma$ curve corresponding to the respective detected values, and performs a density adjustment corresponding to the read $\gamma$ curve.

Moreover, as disclosed in JP-Tokukaihei-11-196275A and JP-Tokukaihei-11-196276A, a technique which produces a histogram on a read image and detects characteristic points (hereinafter referred to as "character points" suitably) of the produced histogram to judge the kind of the image on a basis of the character points is also known.

However, such conventional image processing apparatus perform the density adjustment by selecting a $\gamma$ curve on a basis of the values of either the highlight part or the shadow part, both detected from the histogram of a read image.

For example, when the kind of an original is selected as a "letter", such a conventional image processing apparatus selects a $\gamma$ curve corresponding to a highlight part of a histogram to perform a density adjustment. Hereupon, when the image processing apparatus reads an original of letters having a dark background, the image processing apparatus selects a $\gamma$ curve for performing a light density expression for lightening the background. Consequently, the image processing apparatus has a problem of making letters also light.

Moreover, because an image processing apparatus which automatically judges the kind of a read image performs the judgment only on a gradation at the time of judging an image, the image processing cannot always perform a proper image judgment. Consequently, the image processing apparatus has a problem of the performance of a improper density adjustment owing to an erroneous judgment.

Moreover, in the technique disclosed in JP-Tokukai-2003-51938A, a histogram distribution is obtained, and an image judgment is performed by using a function coefficient approximate to the distribution as a parameter.

However, because this method performs the judgment by focusing attention only on the distribution, the judgment is not performed correctly in case of some gradation widths.

SUMMARY OF THE INVENTION

The present invention relates to a technique for realizing a density adjustment fitted to an image. To put it concretely, it is an object of the present invention to provide a technique for (1) judging the kind of a read image with a high degree of accuracy, and for (2) producing an arbitrary $\gamma$ curve.

According to a first aspect of the present invention, an image processing apparatus comprises:

a histogram calculation section for calculating a histogram of an image;

a highlight part detection section for detecting a highlight part from the histogram;

a shadow part detection section for detecting a shadow part from the histogram;

a $\gamma$ curve production section for producing a $\gamma$ curve by using $\gamma$ values corresponding to each of the highlight part and the shadow part, both obtained on a basis of detection results of the highlight part detection section and the shadow part detection section, respectively; and a density adjustment section for performing a density adjustment of an image on a basis of the $\gamma$ curve produced by the $\gamma$ curve production section.

According to the image processing apparatus of the first aspect, a $\gamma$ curve can be produced and a density adjustment of an image can be performed on the basis of a highlight part and a shadow part, both obtained from the histogram of read image data. Consequently, it is possible to perform a density adjustment fitted to an image on the basis of the highlight part and the shadow part at the time of performing the process of the density adjustment of the image.

According to a second aspect of the present invention, a program makes a computer implement:

calculating a histogram of an image;

detecting a highlight part from the calculated histogram;

detecting a shadow part from the calculated histogram;

producing a $\gamma$ curve by using each $\gamma$ value corresponding to each of the highlight part and the shadow part, both obtained on a basis of detection results of the detecting of the highlight part and the detecting of the shadow part, respectively; and adjusting a density of the image on a basis of the produced $\gamma$ curve.

According to the program of the second aspect, a $\gamma$ curve can be produced, and a density adjustment can be performed on the basis of a highlight part and a shadow part, both obtained from the histogram of image data read in a computer. Consequently, the density adjustment fitted to the image can be performed on the basis of the highlight part and the shadow part at the time of performing the process of the density adjustment of the image.

According to a third aspect of the present invention, an image processing apparatus comprises:

a histogram calculation section for calculating a histogram of an image;

a highlight part specification information detection section for detecting highlight part specification information from the histogram;

a shadow part specification information detection section for detecting shadow part specification information from the histogram; and a section for judging a kind of an image on a basis of the detected highlight specification information and the detected shadow part specification information.

According to the image processing apparatus of the third aspect, it is possible to perform the judgment of the kind of an image on the basis of the specification information of a shadow part or a highlight part. Consequently, a density adjustment fitted to an image is enabled by judging a more proper kind of the image by the execution of a plurality of pieces of judgment sections at the time of the judgment of the kind of a read image.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 2 is a view showing an example of the data structure of an initial value table;

FIG. 4A is a view showing an example of the data structure of a parameter storage area, FIG. 4B is a view showing an example of the data structure of a shadow part storage area, and FIG. 4C is a view showing an example of the data structure of a highlight part storage area;

FIGS. 12A-12C are views showing a γ reference threshold value table determination process;

PREFERRED EMBODIMENTS OF THE INVENTION

Hereinafter, the embodiment of the present invention will be described referring to FIG. 1 to FIG. 14E.

[1. Configuration]

[1.1 Outline of Apparatus]

Figure 1:
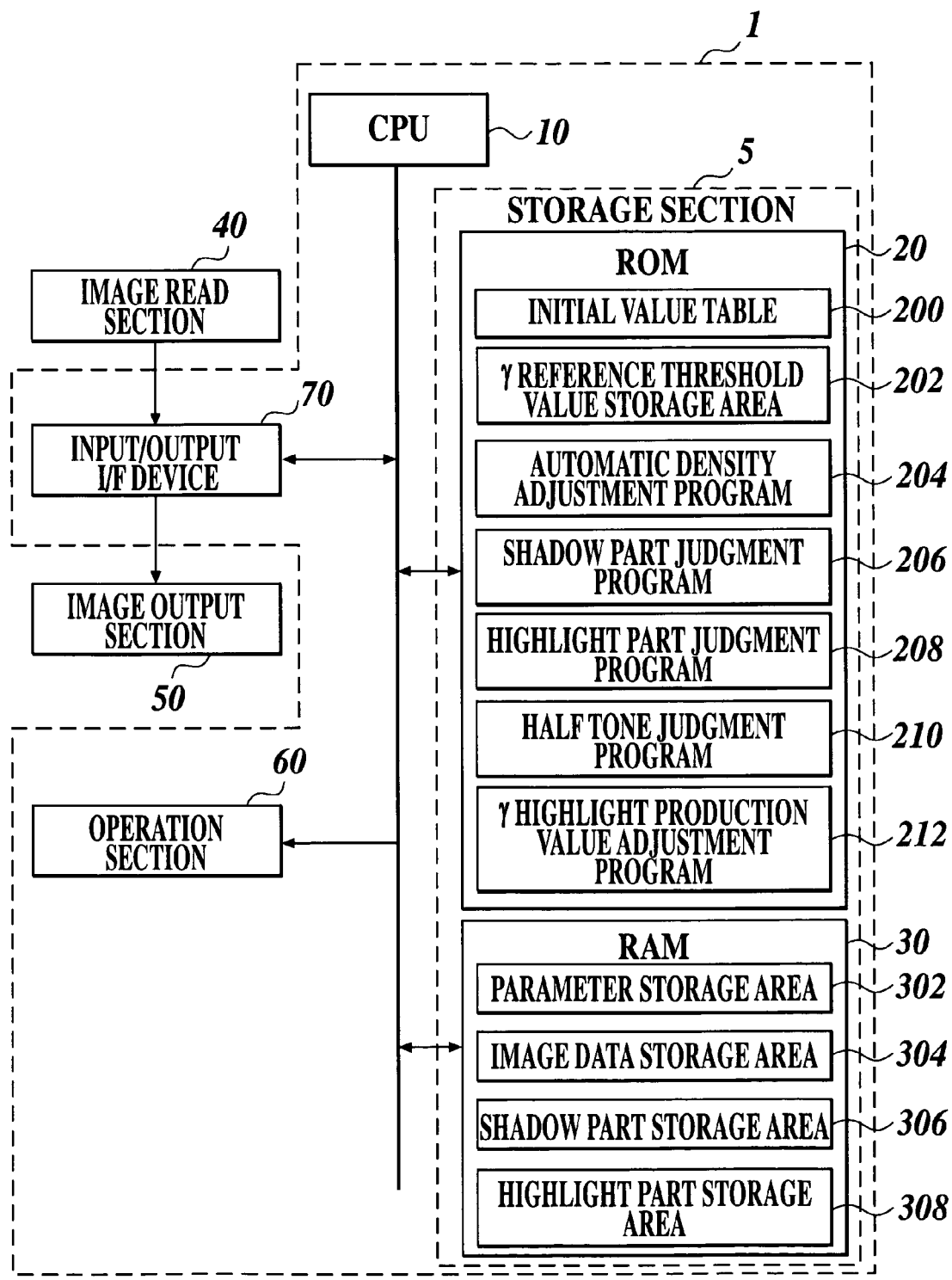
FIG. 1 is a block diagram of an image processing apparatus.

FIG. 1 is a block diagram showing the configuration of an image processing apparatus 1, and the principal part of a copying machine, which part relates to the image processing apparatus 1. The copying machine is a kind of an image forming apparatus including the image processing apparatus 1 built therein. As shown in FIG.1, the image processing apparatus 1 is an apparatus comprising a central processing unit (CPU) 10, a storage section 5 including a read only memory (ROM) 20 and a random access memory (RAM) 30, an operation section 60, and an input/output interface (I/F) device 70. The image processing apparatus 1 is formed in the shape of a substrate for being able to be built in the copying machine. Function units on the copying machine side include an image read section 40 comprising a scanner device including charge coupled devices (CCD's), and an image output section 50 comprising an image formation equipment adopting a laser system or the like. The image read section 40 and the image output section 50 are connected to the image processing apparatus 1 through the input/output I/F device 70. Incidentally, the operation section 60 is shown as a part of the image processing apparatus 1, but the operation section 60 corresponds to an operation panel of the copying machine, and is a function unit used by the copying machine commonly.

[1.2 Descriptions of CPU]

The CPU 10 executes processes based on predetermined programs in accordance with input instructions, and performs instructions to each function unit and transfers of data thereto. To put it concretely, the CPU 10 stores an image input from the image read section 40 as image data into an image data storage area 304. Then, the CPU 10 reads a program stored in the ROM 20, and performs an image process of the image stored in the image data storage area 304 in accordance with the read program. Then, the CPU 10 outputs the processed image to the image output section 50.

[1.2(a) Whole Flow]

Figure 5:
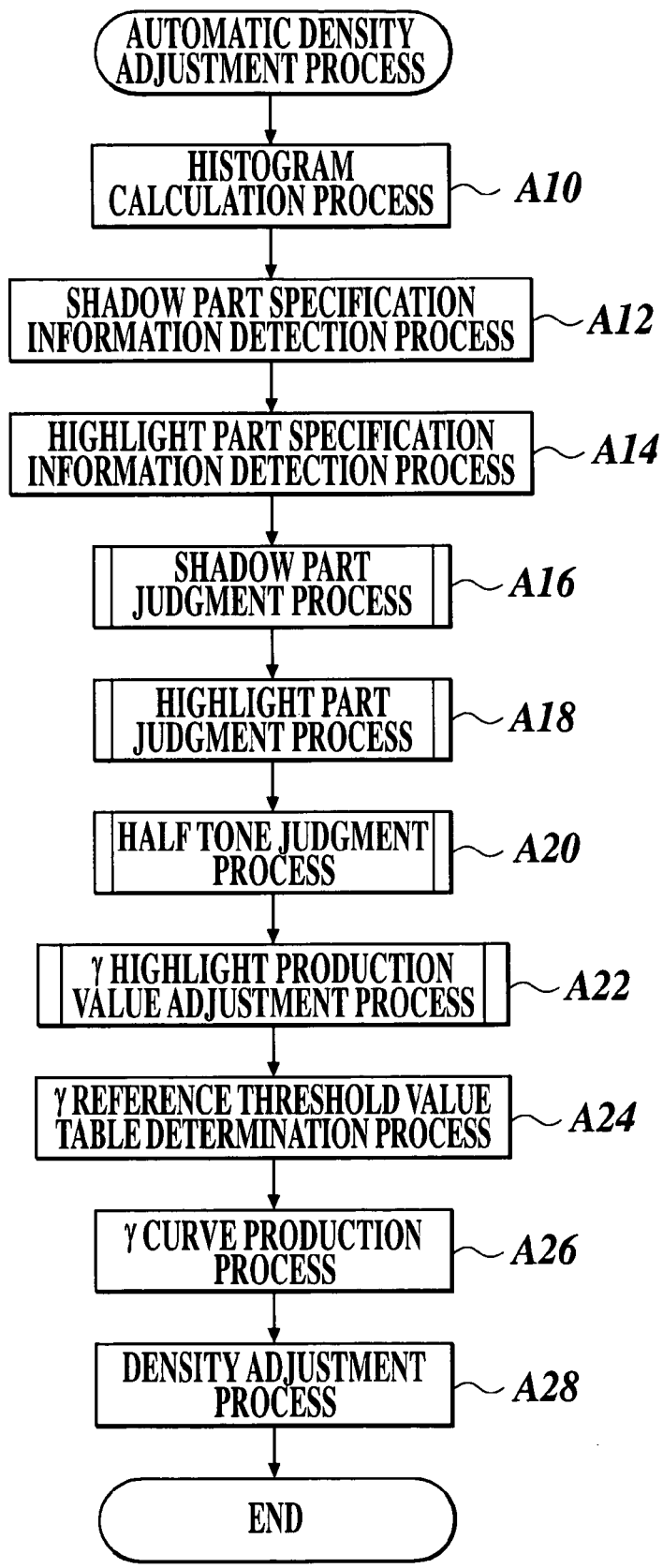
FIG. 5 is a view showing the flowchart of an automatic density adjustment process.

First, an automatic density adjustment process of the whole process flow of the image processing apparatus 1 will be described. FIG. 5 is a flowchart for illustrating the operation of the image processing apparatus 1, which operation relates to the automatic density adjustment process realized by the execution of an automatic density adjustment program 204 by the CPU 10.

The CPU 10 executes a histogram calculation process for calculating the histogram of an image read with the image read section 40 (step A10). Next, the CPU 10 detects shadow part specification information and highlight part specification information from the calculated histogram to detect a shadow part and a highlight part (steps A12 and A14).

Next, the CPU 10 executes a shadow part judgment process (step A16) to judge the kind of the image, and calculates a γ shadow production value. Then, the CPU 10 executes a highlight part judgment process (step A18) to judge the kind of the image, and calculates a γ highlight production value.

Then, the CPU 10 executes a half tone judgment process (step A20) to judge the kind of the image on the information of the half tone of the histogram. Hereupon, the half tone indicates a part between the foot value of the shadow part and the foot value of the highlight part.

Next, the CPU 10 executes a γ highlight production value adjustment process (step A22) to adjust the γ highlight production value calculated at the highlight part judgment process.

Next, the CPU 10 executes a γ reference threshold value table determination process (step A24) to determine a γ value in the highlight part (hereinafter suitably referred to as a "highlight γ value") and a γ value in the shadow part (hereinafter suitably referred to as a "shadow γ value") by using a γ reference threshold value table stored in a γ reference threshold value storage area 202 for producing a γ curve at a γ curve production process at a step A26.

Moreover, the CPU 10 executes the γ curve production process (step A26) to produce a γ curve on the basis of the highlight γ value and the shadow γ value, which have been determined at the γ reference threshold value table determination process.

Then, the CPU 10 executes a density adjustment process (step A28) to perform a density adjustment on the basis of the γ curve produced at the step A26. Then, the CPU 10 outputs the image which has received the density adjustment to the image output section 50 for image formation.

[1.2(b) Outline of Each Process]

Next, descriptions will be given to the outlines of the shadow part specification information detection process, the highlight part specification information detection process, the shadow part judgment process, the highlight part judgment process, the half tone judgment process and the γ highlight production value adjustment process among each of the subroutines of the automatic density adjustment process.

First, the shadow part specification information detection process will be described. The CPU 10 detects the shadow part specification information from the histogram of the image data stored in the image data storage area 304, and stores the detected shadow part specification information into a shadow part storage area 306. Hereupon, the shadow part specification information indicates respective luminance values at a start point (on the side of a lower luminance value than a peak value), at the peak value and at a foot value (on the side of a higher luminance value than the peak value), which have been detected in the low luminance part in the histogram. Moreover, the range in the histogram in which the CPU 10 detects the shadow part specification information is one between the luminance value of "0" to a shadow part threshold value (for example, "100") stored in an initial value table 200.

Next, the highlight part specification information detection process will be described. The CPU 10 executes the highlight part specification information detection process to detect the highlight part specification information, and stores the detected highlight part specification information into a highlight part storage area 308. Hereupon, the highlight part specification information indicates respective luminance values at a start point (on the side of a higher luminance value than a peak value), the peak value and a foot value (on the side of a lower luminance value than the peak value), which are detected from the high luminance part in the histogram. Moreover, the foot value indicates a value detected as a point equal to or less than a foot value detection threshold value stored in the initial value table 200 on the lower side than the peak value. Moreover, when the total of the frequency values from the start point to the foot value of highlight specification information is equal to or less than a background rate threshold value of the sum total of the whole frequency values, the CPU 10 judges that a plurality of highlight parts.exist in the high luminance part of the histogram. Then the CPU 10 detects the highlight part specification information of each of the highlight parts, and stores the detected highlight part specification information into the highlight part storage area 308.

Next, the shadow part judgment process will be described. In accordance with the flowchart of FIG. 6, the CPU 10 judges the kind of the read image, and calculates the γ shadow production value. When the luminance of a foot value stored in the shadow part storage area 306 (hereinafter suitably referred to as a "shadow foot value") and the luminance of a start point stored in the shadow part storage area 306 (hereinafter suitably referred to as a "shadow start point") are equal to or more than a continuous gradation detection threshold value stored in the initial value table 200, the CPU judges the image as a "photograph". When the luminance of the shadow foot value and the luminance of the shadow start point are smaller than the continuous gradation detection threshold value, the CPU 10 judges the image as a "letter". Then, the CPU 10 stores the result of the judgment in a parameter storage area 302. Moreover, the CPU 10 stores the shadow start point or a peak value stored in the shadow part storage area 306 (hereinafter suitably referred to as a "shadow peak value") into the shadow part storage area 306 as a γ shadow production value.

Next, the highlight part judgment process will be described. In accordance with the flowchart of FIG. 7, the CPU 10 judges the kind of the read image, and calculates the γ highlight production value. Then, the CPU 10 judges whether a plurality of parts (crests) detected as highlight parts exists in the highlight part storage area 308 or not. When only one of the part (crest) detected as the highlight part exists, the CPU 10 executes the following judgment. That is, when an interval from a start point stored in the highlight part storage area 308 (hereinafter suitably referred to as a "highlight start point") to a foot value stored in the highlight part storage area 308 (hereinafter suitably referred to as a "highlight foot value") is equal to or more than the continuous gradation detection threshold value, the CPU 10 judges the image as a "photograph". Then, the CPU 10 stores the result of the judgment in the parameter storage area 302. Moreover, the CPU 10 stores the highlight start point into the highlight part storage area 308 as the γ highlight production value.

Next, the half tone judgment process will be described. The CPU 10 calculates the total of the frequency values during the interval from the shadow foot value to the highlight foot value. Then, when the calculated total of the frequency values is less than a judgment rate threshold value stored in the initial value table 200 to the sum total of the whole frequency value in the histogram, the CPU 10 judges the image as a "letter". When the calculated total of the frequency values is equal to or more than the judgment rate threshold value, the CPU 10 judges the image as a "photograph". Then, the CPU 10 stores the result of the judgment into the parameter storage area 302.

Next, the γ highlight production value adjustment process will be described. When the γ highlight production value and the highlight foot value, which are stored in the highlight part storage area 308, are distant from each other more than a gradation possibility threshold value stored in the initial value table 200, the CPU 10 stores a value obtained by subtracting the gradation possibility threshold value from the highlight start point into the highlight part storage area 308 as a new γ highlight production value.

[1.3 Storage Section]

The ROM 20 stores programs and data for realizing various functions of the image processing apparatus 1. The ROM 20 includes the initial value table 200 and the γ reference threshold value storage area 202. The ROM 20 stores the automatic density adjustment program 204, a shadow part judgment program 206, a highlight part judgment program 208, a half tone judgment program 210 and a γ highlight adjustment program 212.

The initial value table 200 is a table for storing initial values of parameters to be used by various programs. The parameters the initial values of which are stored in the initial value table 200 include the shadow part threshold value (for example, "100"), a foot detection threshold value (for example, "3/2"), the background rate threshold value (for example, "0.3"), a continuous gradation detection value (for example, "110"), a true background threshold value (for example, "0.5"), the judgment rate threshold value (for example, "0.3"), and the gradation possibility threshold value (for example, "35").

The γ reference threshold value storage area 202 is an area storing a plurality of γ reference threshold value tables, in which γ values to be used at the time of producing the γ curve are registered. Moreover, the γ reference threshold value tables are tables each storing a plurality of γ reference threshold values corresponding to density setting values.

For example, the γ reference threshold value storage area 202 stores the γ reference threshold value table (see, for example, FIG. 3A), which is referred to when a read image is judged to be a color image and the kind of the image is judged to be a "photograph", the γ reference threshold value table (see, for example, FIG. 3B), which is referred to when a read image is judged to be a color image and the kind of the image is judged to be a "letter", and the γ reference threshold value table (see, for example, FIG. 3C), which is referred to when a read image is judged to be a monochrome image, or a black-and-white image.

Figure 3A:
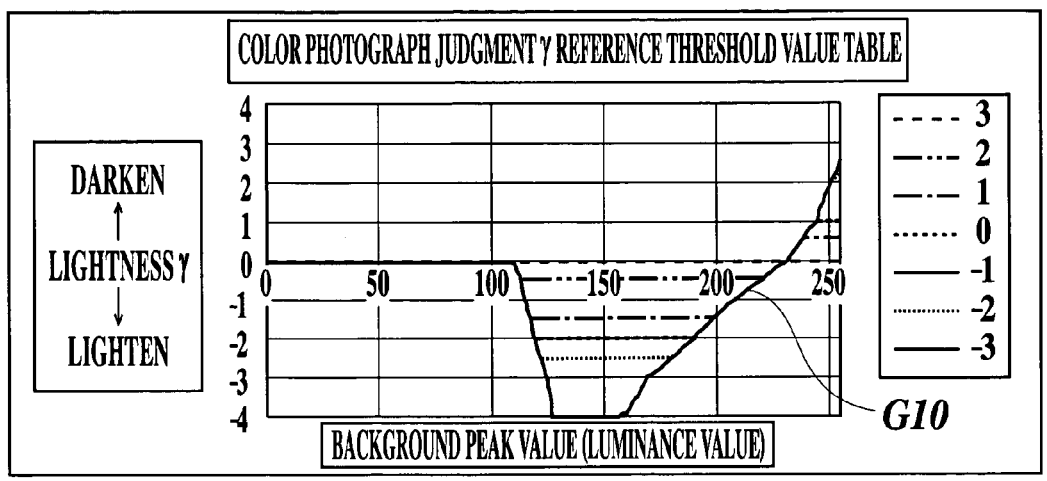
FIGS. 3A to 3C are views showing examples of γ threshold value reference tables.
Figure 3B:
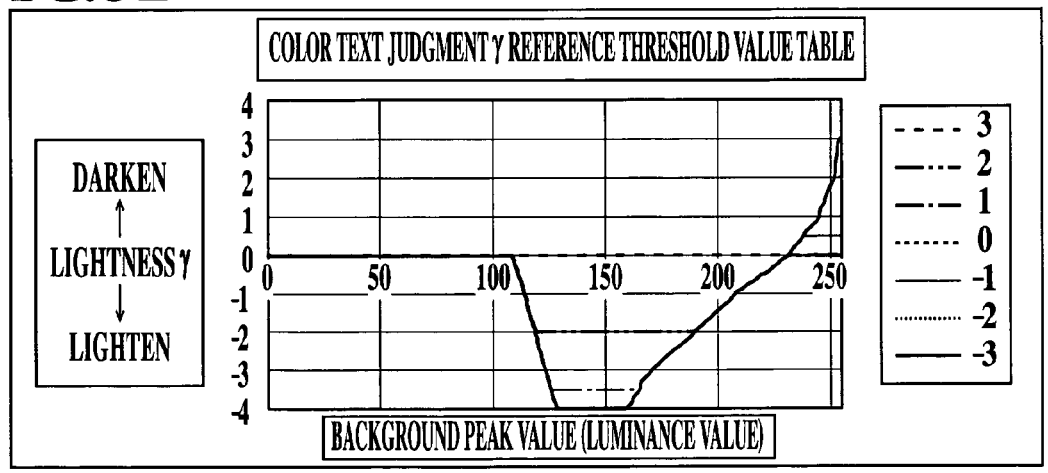
Figure 3C:
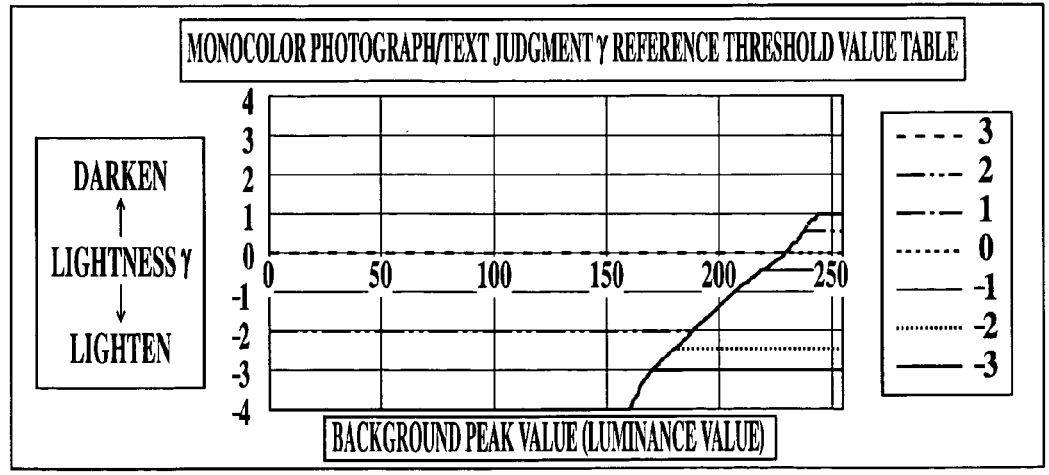

Hereupon, the γ reference threshold value table is a table for storing γ values, which the CPU 10 refers to at the γ curve production process (at the step A26 in FIG. 5) to be executed in the automatic density adjustment process, which will be described later. For example, the γ reference threshold value table is expressed as a graph as shown in FIG. 3A, in which graph background peak values (luminance values) are registered on the abscissa axis thereof and lightness γ is registered on the ordinate axis thereof. The background peak values on the abscissa axis correspond to the luminances of images. The left side end of the abscissa axis is set to be the value of "0" of the luminance, and the right side end of the abscissa axis is set to be a high luminance value (for example, the value of "255") of the luminance. Moreover, the lightness γ of the ordinate axis indicates γ values.

Moreover, the values ranging from "3" to "−3" registered in the γ reference threshold value table indicate density setting values. A user inputs a density setting value into the image processing apparatus 1 as an initial value before the execution of the automatic density adjustment process. Then, the CPU 10 stores the set density setting value into the parameter storage area 302.

For example, when the density setting value of "−3" is stored and the kind of image data is a color image and an original of photographs, the CPU 10 determines a graph G10 in FIG. 3A as the γ reference threshold value. Incidentally, in the present embodiment, the values settable as the density setting values are made to be seven steps of integer values from "3" to "−3". However, the density setting values are not limited to such values. It is needless to say that the density setting values can be set to have finer steps.

The RAM 30 is equipped with a memory area to hold various programs to be executed by the CPU 10, data related to the execution of the programs, and the like temporarily. In the present embodiment, the RAM 30 includes the parameter storage area 302, the image data storage area 304, the shadow part storage area 306 and the highlight part storage area 308.

The parameter storage area 302 is an area in which a density setting value (for example, "0"), which is a value to be set by a user before the execution of the automatic density adjustment process when the process is executed, and a color/monochrome selection value (for example, "color") indicating whether an image is a color image or a monochrome image are stored. Moreover, at each process, the CPU 10 judges whether the kind of a read image is a "photograph" or a "letter", and stores the kind of the image (for example, a "photograph") as the result of the judgment.

FIGS. 4A to 4C show the image data storage areas. The image data storage area 304 is an area in which the CPU 10 stores the image data read from the image read section 40. The CPU 10 executes the automatic density adjustment process to update the image data stored in the image data storage area 304.

The shadow part storage area 306 is an area for storing values for specifying a shadow part. When a shadow part specification information detection process is executed by the CPU 10, the start point (for example, "0"), the peak value (for example, "20") and the foot value (for example, "72") of a shadow part are stored in the shadow part storage area 306. Moreover, when a shadow part judgment process is executed by the CPU 10, a γ shadow production value (for example, "20") is stored.

The highlight part storage area 308 is an area for storing the values for specifying a highlight part. When a highlight part specification information detection process is executed by the CPU 10, the start point (for example, "0"), the peak value (for example, "20") and the foot value (for example, "72") of a highlight part are stored in the highlight part storage area 308. Moreover, when a highlight part judgment process is executed by the CPU 10, a γ highlight production value (for example, "20") is stored. Moreover, a plurality pieces of the highlight part specification information may be detected. In such a case, all pieces of the highlight part specification information are stored.

[2. Operation]

Next, the automatic density adjustment process to be executed by the CPU 10 of the present embodiment will be described. First, the CPU 10 stores parameters set with a density value setting section included in the operation section 60 into the parameter storage area 302 before the execution of the automatic density adjustment process. To put it concretely, the CPU 10 stores (1) a parameter indicating whether an image to be read is a color image or a monochrome image, and (2) a parameter of a density setting value to the image into the parameter storage area 302. Hereupon, the density setting value to an image indicates a parameter to be used in a γ reference threshold value table determination process (step A24 in FIG. 5), which will be described later.

Next, the CPU 10 stores an image input from the image read section 40 into the image data storage area 304 as image data. Incidentally, descriptions will be given to the case where an image to be read by the image read section 40 is a "color" image in the following, but the image to be read is not limited to the "color" image.

[2.1 Automatic Density Adjustment Process]

FIG. 5 is a flowchart for illustrating the operation of the image processing apparatus related to the automatic density adjustment process thereof. The automatic density adjustment process is a process realized by the execution of the automatic density adjustment program 204 stored in the ROM 20 of the CPU 10.

In the automatic density adjustment process, the CPU 10 executes various processes to produce the optimum γ curve to the image stored in the image data storage area 304. In the following, each process included in the automatic density adjustment process will be described.

[2.2 Histogram Calculation Process]

First, the CPU 10 calculates the histogram of the image data stored in the image data storage area 304 (step A10). The execution of the histogram calculation process by the CPU 10 realizes the function as a histogram calculation section. Because variously devised well known histogram calculation methods can be applied to the histogram calculation section, the detailed descriptions are omitted.

[2.3 Shadow Part Specification Information Detection Process]

[2.3(a) Flow of Process]

Next, the shadow part specification information detection process (step A12 in FIG. 5) will be described. The shadow part specification information detection process is a process for detecting the information for specifying a shadow part from the histogram calculated at the step A10. The execution of the shadow part specification information detection process by the CPU 10 realizes the function as a shadow part detection section.

The CPU 10 detects shadow part specification information comprising a peak value, a foot value and a start point, from the low luminance part of the histogram calculated at the step A10. To put it concretely, the CPU 10 scans the histogram calculated at the step A10 toward the higher luminance direction from the value of "0" to the shadow part threshold value (for example, the value of "100") stored in the initial value table 200. Then, the CPU 10 stores the luminance value at the point where the low luminance part starts in the shadow part storage area 306 as the start point of the shadow part, and also stores the luminance value at the point where the frequency value of the histogram of a low luminance part takes a peak (the maximum frequency value) in the area 306 as a peak value, and further stores the luminance value at the point where the histogram of the low luminance part end in the area 306 as a foot value. Hereupon, the foot value of the low luminance part indicates the value of the part where the low luminance part ends. For example, a point where the frequency value is a value of a predetermined rate (for example, the value of "⅓" or less) of the peak value is detected as the foot value. Moreover, when no shadow part specification information can be detected in the range of the luminance value of from the value of "0" to the shadow part threshold value, the CPU 10 made all of the peak value, the foot value and the start point the value of "0".

In such a way, the detection of the start point, the peak value and the foot value of the low luminance part of the histogram enables the specification of a shadow part in the histogram.

[2.3(b) Concrete Examples]

Figure 8A:
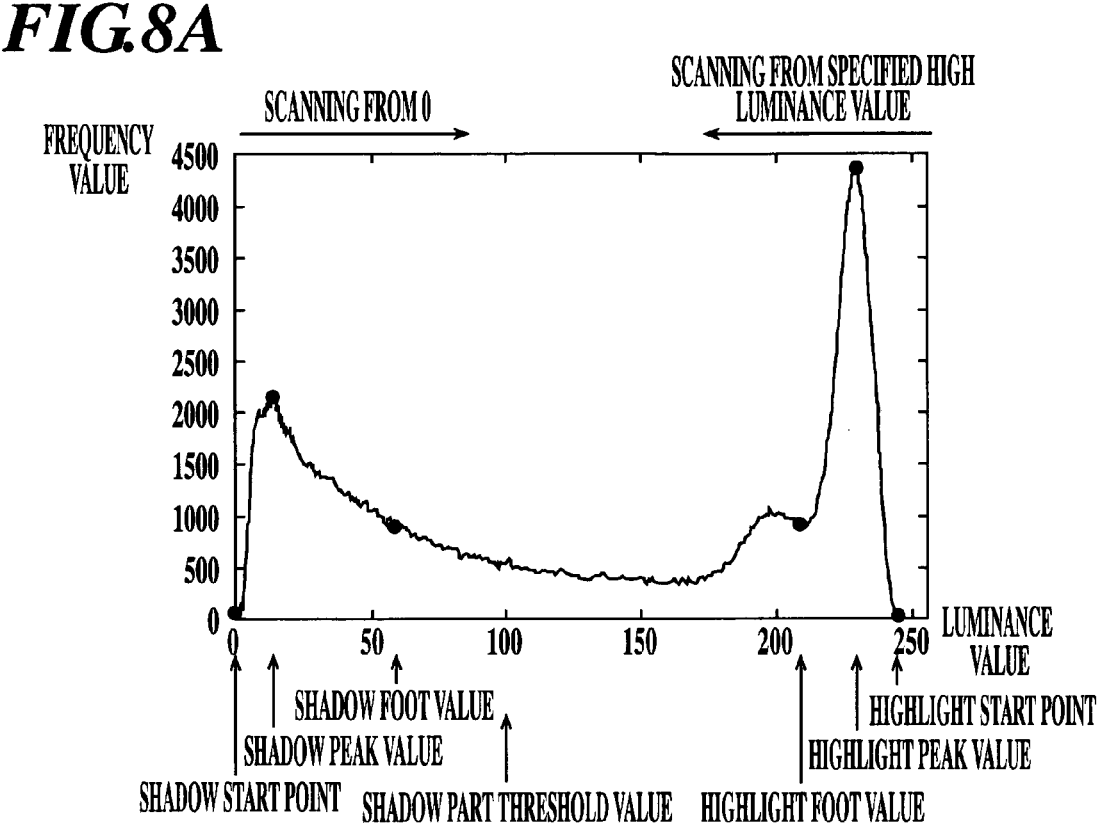
FIGS. 8A and 8B are views showing histograms.

The histogram shown in FIG. 8A will be referred to while the shadow part specification information detection process is concretely described. First, the CPU 10 scans the histogram from the value "0" toward the higher luminance direction, and sets the luminance value at a point where a frequency value is first detected as the start point. Then, the CPU 10 further scans the histogram toward the higher luminance direction, and detects the luminance value at the point where the frequency value takes a peak (the maximum frequency value) as the peak value. Then, the CPU 10 detects the luminance value at the point where the frequency value is a value of a predetermined rate of the frequency value at the peak value or less (for example, the value of "⅓" or less) as the foot value. Then, the CPU 10 stores the detected "start point", the detected "peak value" and the detected "foot value" into the shadow part storage area 306.

[2.4 Highlight Part Specification Information Detection Process]

[2.4(a) Flow of Process]

Next, the highlight part specification information detection process (step A14 of FIG. 5) will be described. The highlight part specification information detection process is a process for detecting the information of the highlight part of the histogram calculated at the step A10. The execution of the highlight part specification information detection process by the CPU 10 realizes the function as a highlight part detection section.

The CPU 10 detects highlight part specification information comprising a peak value, a foot value and a start point from the high luminance part of the histogram calculated at the step A10. Then, the CPU 10 specifies the highlight part of the histogram by detecting the highlight part specification information.

First, the CPU 10 detects the luminance value at the point where the frequency value takes a peak (the maximum value) as the peak value from the high luminance part. Next, the CPU 10 detects the luminance value at the point where the frequency value is equal to or less than a rate of the foot value detection threshold value (for example, "⅔"), stored in the initial value table 200, of the frequency value corresponding to the peak value as the foot value. Then, the CPU 10 performs the scanning of the histogram from the detected peak value toward the high luminance value direction to detect the start point.

Moreover, when the total of the detected frequency value from the start point to the foot value of the high luminance part is equal to or less than the background rate threshold value of the sum total of the whole frequency values, the CPU 10 further performs the scanning of the histogram toward the direction of the value "0", and executes a detection process of another highlight part.

[2.4(b) Concrete Example]

Figure 8B:
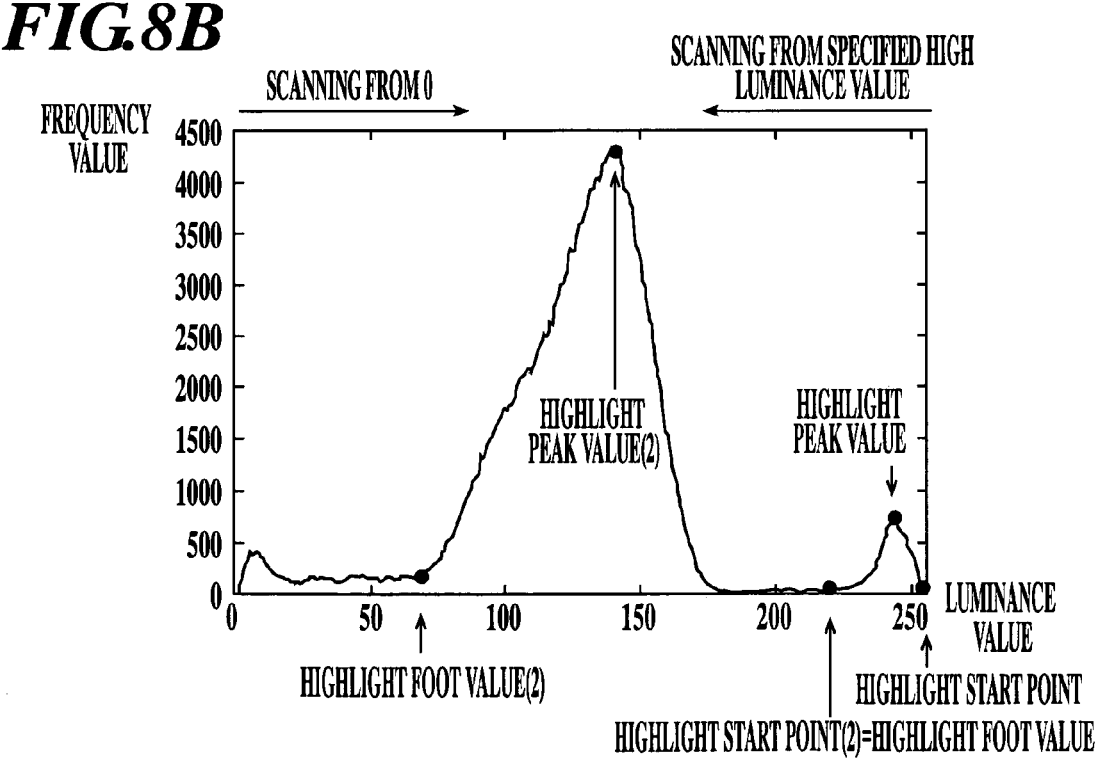

The histograms shown in FIGS. 8A and 8B will be referred to while the highlight part specification information detection process is concretely described. FIG. 8A shows the case where the histogram has only one crest in the high luminance part, and FIG. 8B shows the case where the histogram has two crests in the high luminance part.

First, FIG. 8A is referred to while the description is preformed. The CPU 10 scans the histogram from the value of "255" toward the direction of the value "0". Then, the CPU 10 detects the luminance value at a point where the frequency value takes a peak in the high luminance part as the peak value. Next, the CPU 10 further scans the histogram from the peak value toward the value of "0", and detects the luminance value at the point where the rate of the frequency value to the frequency value corresponding to the peak value is equal to or less than "⅔" stored in the initial value table 200 as the foot value. Moreover, the CPU 10 performs the scanning of the histogram from the detected peak value toward the high luminance direction to detect the start point. Then, the CPU 10 stores the detected "start point", the detected "peak value" and the detected "foot value" into the highlight part storage area 308.

Next, FIG. 8B will be used for the following description. As described above, the CPU 10 detects the highlight part specification information comprising the first "start point", the first "peak value" and the first "foot value" in the high luminance part in the histogram. Next, the CPU 10 judges whether the total of the frequency values from the start point up to the foot value, which frequency values have been detected at the highlight part specification information detection process, is equal to or less than the background rate threshold value "30%" of the sum total of the whole frequency value of the histogram or not. In case of the FIG. 8B, because the total of the frequency values is equal to or smaller than the background rate threshold value "30%" of the whole frequency value of the sum total, the CPU 10 further performs the scanning toward the direction of the value of "0" to detect a "peak value", a "foot value" and a "start point" furthermore. Thereby, the CPU 10 stores the detected values in the highlight part storage area 308 as the second highlight part specification information.

[2.5 Shadow Part Judgment Process]

[2.5(a) Flow of process]

Figure 6:
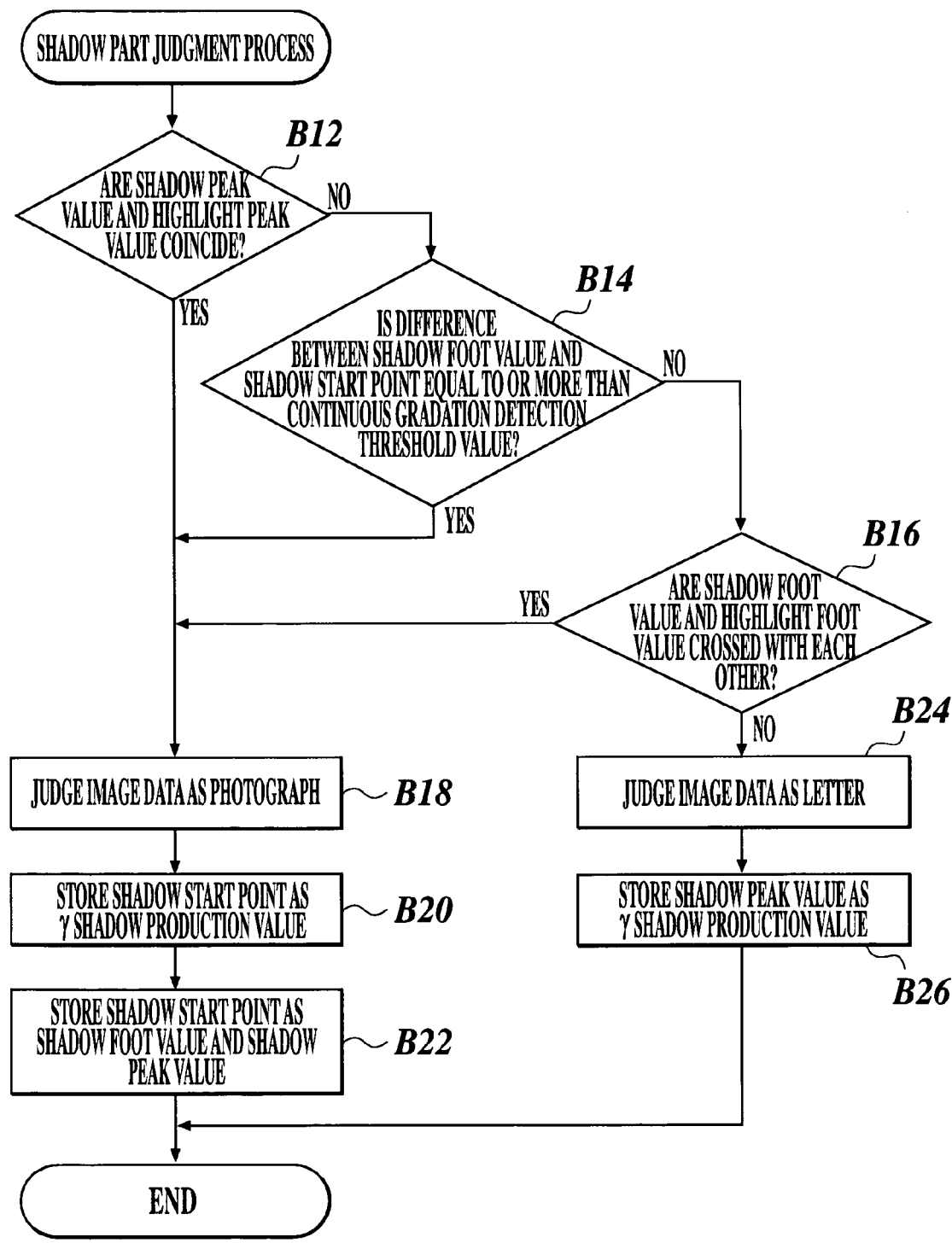
FIG. 6 is a view showing the flowchart of a shadow part judgment process.

FIG. 6 is a flowchart for illustrating the operation of the image processing apparatus with regard to the shadow part judgment process. The shadow part judgment process is realized by the execution of the shadow part judgment program 206 stored in the ROM 20 by the CPU 10.

First, the CPU 10 judges whether the shadow peak value and the peak value stored in the highlight part storage area 308 (hereinafter suitably referred to as a "highlight peak value") coincide with each other or not (step B12). When the CPU 10 judges that both the values coincide with each other as the result of the comparison (Yes at the step B12), the CPU 10 judges the image data to be the data of a "photograph", and stores the result of being a "photograph" in the parameter storage area 302 (step B18).

When the CPU 10 judges that the shadow peak value and the highlight peak value do not coincide with each other (No at the step B12), the CPU 10 judges whether the difference between the shadow foot value and the shadow start point is equal to or more than the continuous gradation detection threshold value stored in the initial value table 200 or not (step B14). When the CPU 10 judges that the difference between the shadow foot value and the shadow start point is equal to or more than the continuous gradation detection threshold value stored in the initial value table 200 (Yes at the step B14), the CPU 10 judges the image data as the data of a "photograph", and stores the data in the parameter storage area 302 as the data of the "photograph" (step B18).

Moreover, when the CPU 10 judges that the difference between the shadow foot value and the shadow start point is not equal to or more than the continuous gradation detection threshold value (No at the step B14), the CPU 10 judges whether the shadow foot value and the highlight foot value cross with each other or not (step B16). When the CPU 10 judges that the shadow foot value and the highlight foot value cross with each other (Yes at the step B16), the CPU 10 judges that the image data is the data of a "photograph", and stores the image data in the parameter storage area 302 as the data of the "photograph".

Moreover, when the CPU 10 judges that the shadow foot value and the highlight foot value do not cross each other (No at the step B16), the CPU 10 judges that the image data is the data of a "letter", and stores the data in the parameter storage area 302 as the data of the "letter" (step B24).

Then, when the CPU 10 judges that the image data is the data of a "photograph", the CPU 10 stores the value of the shadow start point in the shadow part storage area 306 as a γ shadow production value (step B20). Moreover, the CPU 10 stores the value of the shadow start point in the shadow part storage area 306 as the shadow foot value and the shadow peak value (step B22).

Moreover, when the CPU 10 judges that the image data is the data of a "letter", the CPU 10 stores the shadow peak value in the shadow part storage area 306 as the γ shadow production value (step B26).

[2.5(b) Concrete Example]

The histogram of FIG. 8A will be referred to while the shadow part judgment process is concretely described. First, the CPU 10 judges whether the shadow peak value and the highlight peak value coincide with each other or not. In case of FIG. 8A, because they do not coincide with each other, the CPU 10 judges whether the difference between the shadow foot value and the shadow start point is equal to or more than the continuous gradation detection threshold value (for example, "110") or not. In case of FIG. 8A, because they do not coincide with each other, the CPU 10 judges whether the shadow foot value and the highlight foot value cross with each other or not. In the case of FIG. 8A, because they do not cross with each other, CPU 10 judges that the image data shown by the histogram of FIG. 8A is the data of a "letter", and stores the data in the parameter storage area 302. Then, the CPU 10 stores the shadow peak value in the shadow part storage area 306 as the γ shadow production value.

[2.6 Highlight Part Judgment Process]

[2.6(a) Flow of process]

Figure 7:
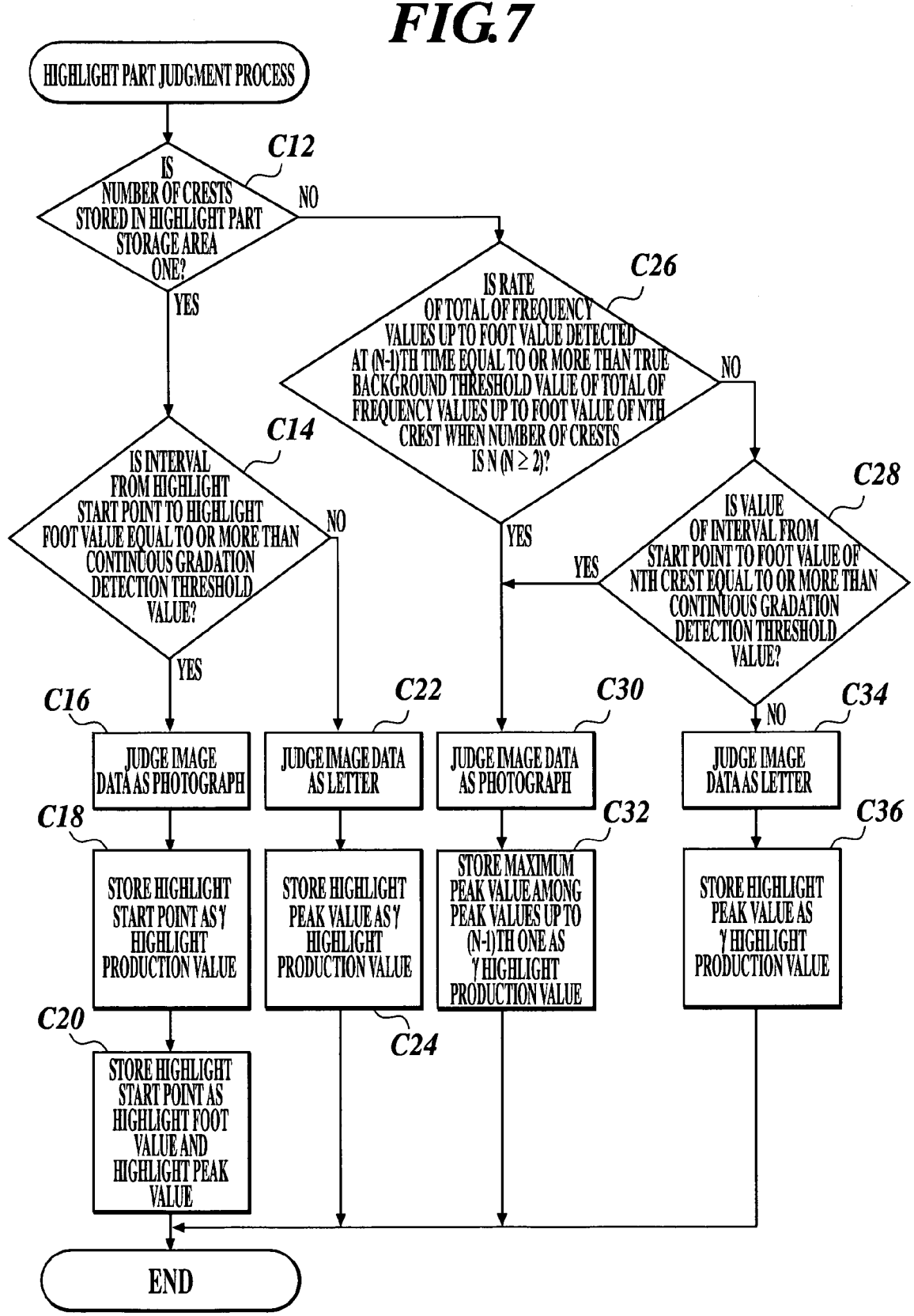
FIG. 7 is a view showing the flowchart of a highlight part judgment process.

Next, the highlight part judgment process will be described. FIG. 7 is a flowchart for illustrating the operation of the image processing apparatus with regard to the highlight part judgment process. The highlight part judgment process is a process realized by the execution of the highlight part judgment program 208 stored in the ROM 20 by the CPU 10.

First, when the CPU 10 judges that the number of the highlight parts (their crests) is one (Yes at step C12), the CPU 10 judges whether the interval from the highlight start point to the highlight foot value is equal to or more than the continuous gradation detection threshold value stored in the initial value table 200 or not (step C14). Then, when the CPU 10 judges that the interval from the highlight start point to the highlight foot value is equal to or more than the continuous gradation detection threshold value (Yes at the step C14), the CPU 10 judges that the image data is the data of a "photograph" (step C16), and stores the data of the "photograph" in the parameter storage area 302. Moreover, the CPU 10 stores the highlight start point in the highlight part storage area 308 as γ highlight production value (step C18) Moreover, the CPU 10 stores the value of the highlight start point in the highlight part storage area 308 as the foot value and the peak value (step C20).

Moreover, when, although the CPU 10 has judged that the number of the crest stored in the highlight part storage area 308 is one (Yes at the step C12), the CPU 10 judges that the interval from the highlight start point to the highlight foot value is not equal to or more than the continuous gradation detection threshold value (No at the step C14), the CPU 10 judges that the image data is the data of a "letter" (step C22), and stores the data in the parameter storage area 302 as the "letter". Then, the CPU 10 stores the highlight peak value in the highlight part storage area 308 as the γ highlight production value (step C24).

Moreover, when the CPU 10 judges that two or more highlight parts (their crests) stored in the highlight part storage area 308 exist (No at the step C12), the CPU 10 executes the processes of or after a step C26.

First, when there are n highlight parts (their crests), the CPU 10 judges whether the rate of the total of the frequency values up to the foot value detected at the (n−1)th time is equal to or more than the true background threshold value of the total of the frequency values up to the foot value of the nth crest or not (step C26).

Hereupon, when the condition of the step C26 is satisfied (Yes at the step C26), the CPU 10 judges that the image data is the data of a "photograph", and stores the data of the "photograph" in the parameter storage area 302 (step C30). Then, the CPU 10 stores the maximum highlight peak value among the highlight peak values up to the (n−1)th one in the highlight part storage area 308 as the γ highlight production value (step C32).

Moreover, when the condition of the step C26 is not satisfied (No at the step C26), the CPU 10 judges whether the value of the interval from the nth highlight start point to the highlight foot value is equal to or more than the continuous gradation detection threshold value or not (step C28). Hereupon, when the CPU 10 judges that the condition of the step C28 is satisfied (Yes at the step C28), the CPU 10 judges that the image data is the data of a "photograph", and executes the steps C30 and C32.

Moreover, when the CPU 10 judges that the condition of the step C28 is not satisfied (No at the step C28), the CPU 10 judges that the image data is the data of a "letter", and stores the data of the "letter" in the parameter storage area 302 (step C34). Then, the CPU 10 stores the nth highlight peak value in the highlight part storage area 308 as the γ highlight production value (step C36).

[2.6(b) Concrete Example]

The histograms shown in FIGS. 8A and 8B will be referred to while the highlight part judgment process is concretely described. First, the histogram of FIG. 8A is an example of the case where there is one crest in a high luminance part, and the histogram shown in FIG. 8B is an example of the case where there are two crests in the high luminance part.

First, because the histogram of FIG. 8A has one crest in the high luminance part, the CPU 10 judges whether the interval from the highlight start point to the highlight foot value is equal to or more than the continuous gradation detection threshold value ("110") stored in the initial value table 200. In case of FIG. 8A, because the interval cannot be recognized to be equal to or more than the continuous gradation detection threshold value, the CPU 10 judges that the image data is the data of a "letter", and stores the data of the "letter" in the parameter storage area 302. Moreover, the CPU 10 stores the highlight peak value in the highlight part storage area 308 as the γ highlight production value.

Moreover, the histogram of FIG. 8B has two highlight parts. Then, the CPU 10 judges whether the rate of the total of the frequency values up to the foot value of the highlight part detected at the first time is equal to or more than the true background threshold value ("0.5") of the total of the frequency values of the highlight part at the second time or not. In case of the histogram shown in FIG. 8B, because the result of the judgment is negative, the CPU 10 judges whether the value of the interval up to the foot value of the highlight part detected at the second time is equal to or more than the continuous gradation detection threshold value ("110") or not. In the case shown in FIG. 8B, the result of the judgment satisfies the condition. Consequently, the CPU 10 judges that the image data is the data of a "photograph", and stores the data indicating the "photograph" in the parameter storage area 302. Moreover, the CPU 10 stores the first highlight peak value into the highlight part storage area 308 as the γ highlight production value.

As described above, according to the highlight part judgment process, it is possible to calculate the γ highlight production value corresponding to the read image by means of the histogram of the image data. Consequently, the highlight part of the read image can be used effectively.

[2.7 Half Tone Judgment Process]

[2.7(a) Flow of Process]

Next, the half tone judgment process (step A20 shown in FIG. 5) will be described. The half tone judgment process is a process to be executed for judging the kind of the image data furthermore after the execution of the processes up to the step A18 by the CPU 10 in the automatic density adjustment process. The execution of the half tone judgment process by the CPU 10 in accordance with the half tone judgment program 210 realizes the function as a judgment section in the image processing apparatus 1.

The CPU 10 calculates the frequency values included in the range of from the shadow foot value to the highlight foot value, and calculates the rate of the calculated frequency values in comparison with the sum total of the whole frequency value (step D10). Then, when the calculated rate is equal to or more than the judgment rate threshold value stored in the initial value table 200 (Yes at a step D12), the CPU 10 judges that the image data is the data of a "photograph", and stores the data indicating the "photograph" in the parameter storage area 302 to update the parameter storage area 302. Moreover, when the condition of the step D12 is not satisfied (No at the step D12), the CPU 10 judges that the image data is the data of a "letter", and stores the data indicating the "letter" in the parameter storage area 302.

[2.7(b) Concrete Example]

Figure 10A:
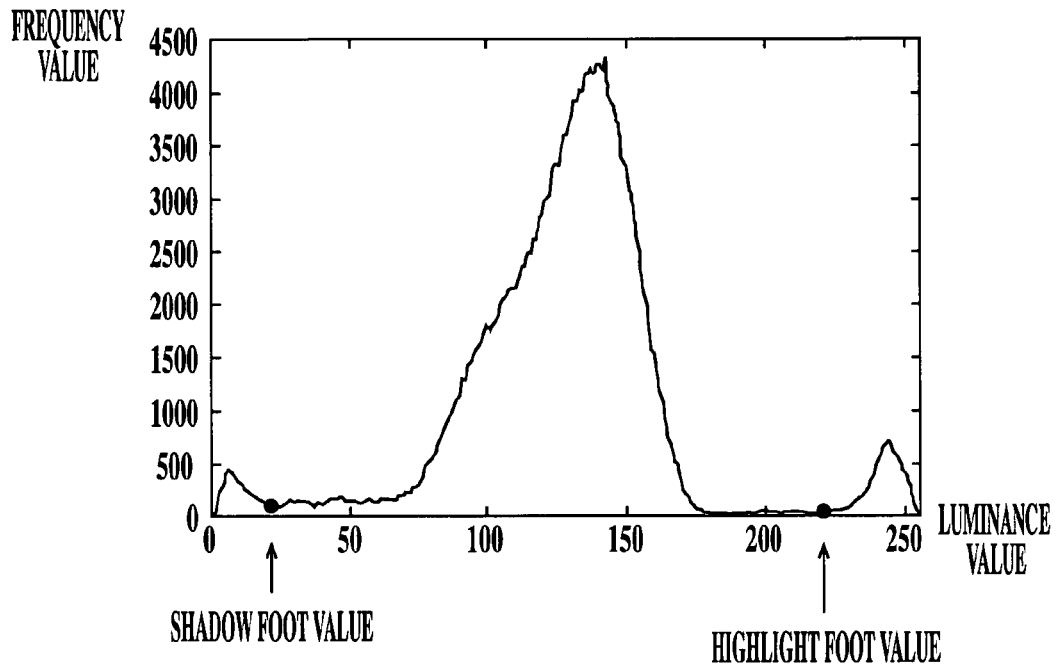
FIGS. 10A and 10B are views showing histograms.
Figure 10B:
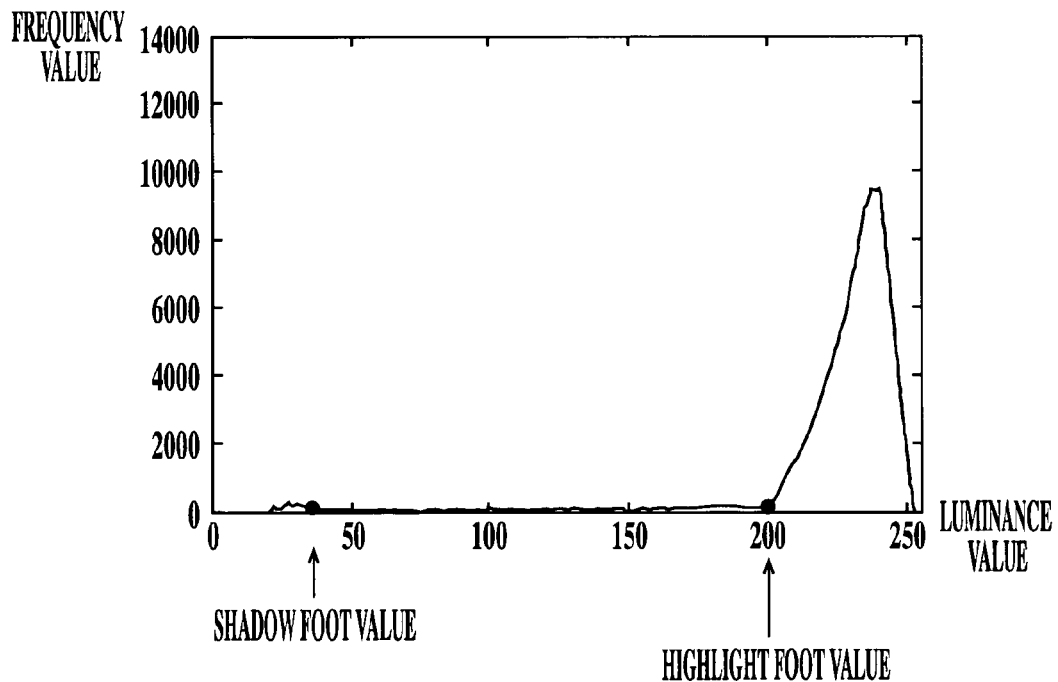

The histograms shown in FIGS. 10A and 10B will be referred to while the half tone judgment process is concretely described. First, in case of the histogram shown in FIG. 10A, the CPU 10 calculates the frequency values included in the range of from the shadow foot value to the highlight foot value, and further calculates a rate of the calculated frequency values to the sum total of the whole frequency value. Then, the CPU 10 judges. whether the calculated rate is equal to or more than the judgment rate threshold value (for example, "0.3") stored in the initial value table 200 or not. Because the calculated rate is equal to or more than the judgment rate threshold value in case of the histogram shown in FIG. 10A, the CPU 10 judges that the image data is the data of a "photograph", and stores the data indicating the "photograph" in the parameter storage area 302.

Moreover, in case of the histogram shown in FIG. 10B, the CPU 10 calculates the frequency values included in the range of from the shadow foot value to the highlight foot value, and calculates the rate in comparison with the sum total of the whole frequency value. Because the calculated rate is smaller than the judgment rate threshold value, the CPU 10 judges that the image data is the data of a "letter", and stores the data indicating the "letter" in the parameter storage area 302.

According to the half tone judgment process, it is possible to judge the kind of an image according to the state read from the parts other than the shadow parts and the highlight parts of the histogram. Consequently, even when the kind of an image judged from the shadow part is different from the kind of the image quality judged from the highlight part, it becomes possible to obtain a more proper kind of the image by the anew judgment of kind of the image according to the present process.

[2.7(c) Variations]

Incidentally, for the sake of the judgment of the kind of an image, an inclination judgment process for performing judgment by means of the inclination at a shadow peak value or a highlight peak value can be used in place of the half tone judgment process.

For example, the CPU 10 calculates inclinations at two points of the highlight foot value and the highlight peak value on the basis of the frequency value and the luminance value at the highlight foot value and the frequency value and the luminance value at the highlight peak value. Then, the CPU 10 judges the kind of an image to be a "letter" when the inclination is larger than a predetermined inclination, or to be a "photograph" when the inclination is equal to or smaller than the predetermined inclination. Incidentally, the highlight part specification information is used as the foot value and the peak value in the above description. However, the shadow part specification information can be used, and a peak value and a start point may be used.

For example, in case of the histogram shown in FIG. 8A, the CPU 10 calculates the inclinations of the highlight foot value and the highlight peak value. To put it concretely, the CPU 10 set the following value as the inclination. That is, the value is obtained by dividing a value obtained by subtracting a frequency value corresponding to the highlight foot value from a frequency value corresponding to the highlight peak value by a value obtained by subtracting the luminance value corresponding to the highlight foot value from the luminance value corresponding to the highlight peak value. Then, in case of the histogram shown in FIG. 8A, when the inclination is judged to be larger than the predetermined inclination, the CPU 10 judges that the image data is the data of a "letter".

[2.8 γ Highlight Production Value Adjustment Process]

[2.8(a) Flow of Process]

Next, the γ highlight production value adjustment process will be described. The γ highlight production value adjustment process is a process to be executed for the adjustment of a γ highlight value according to image data after the execution of the processes up to the step A22 in the automatic density adjustment process. The CPU 10 executes the γ highlight production value adjustment process in accordance with the γ highlight production value adjustment program 212 (step A22 shown in FIG. 5).

Figure 9A:
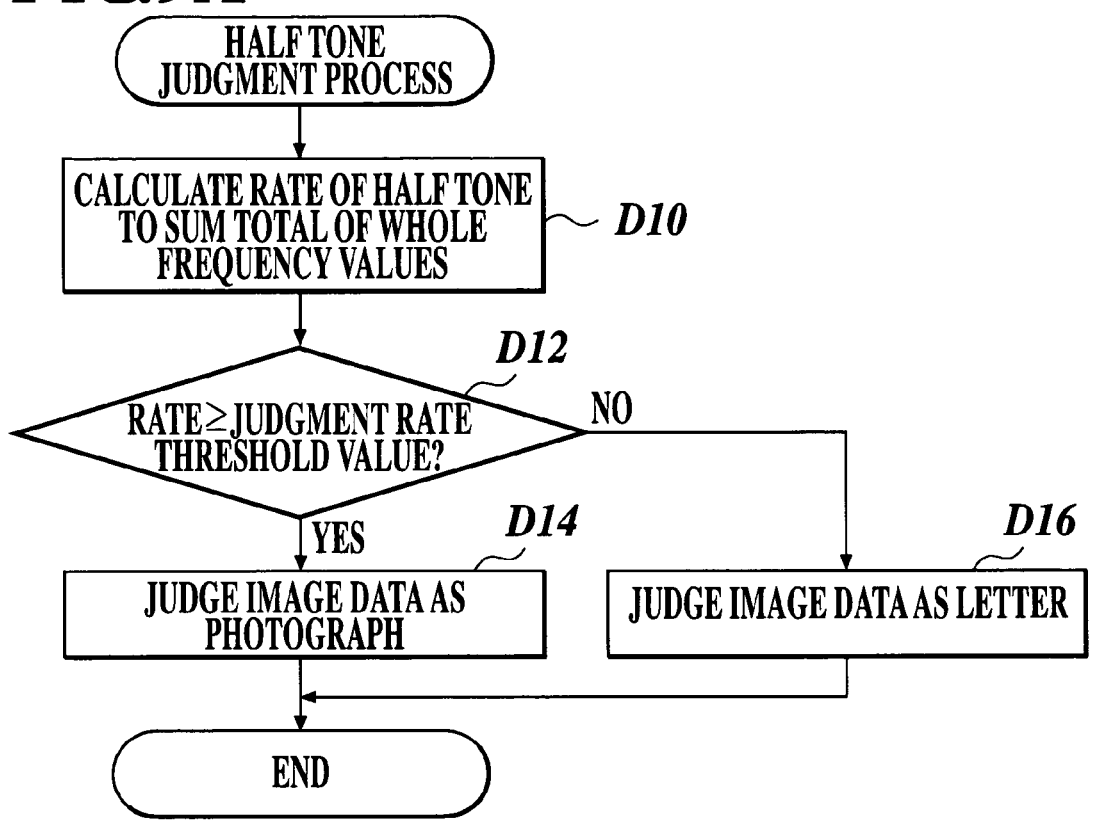
FIG. 9A is a view showing the flowchart of a half tone judgment process.
Figure 9B:
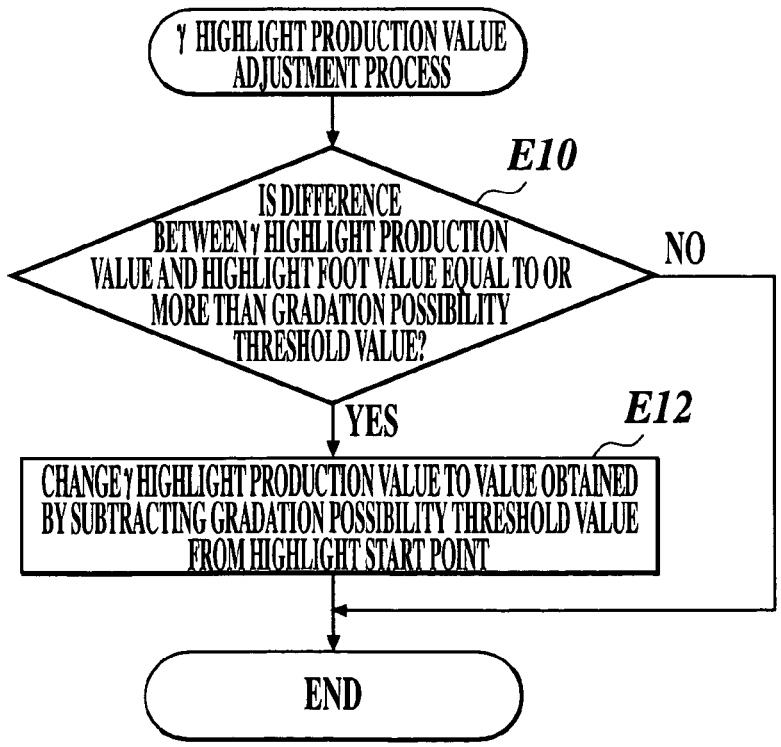
FIG. 9B is a view showing the flowchart of a γ highlight production value adjustment process.

FIG. 9B is a flowchart for illustrating the operation of the image processing apparatus according to the γ highlight production value adjustment process. First, the CPU 10 judges whether a value obtained by the subtraction of the highlight foot value used at the time of the calculation of the γ highlight production value from the γ highlight production value is equal to or more than the gradation possibility threshold value or not (step E10). When the condition of the step E10 is satisfied, the CPU 10 changes the γ highlight production value to a value obtained by the subtraction of the gradation possibility threshold value from the highlight start point (step E12).

[2.8(b) Concrete Example]

Figure 11:
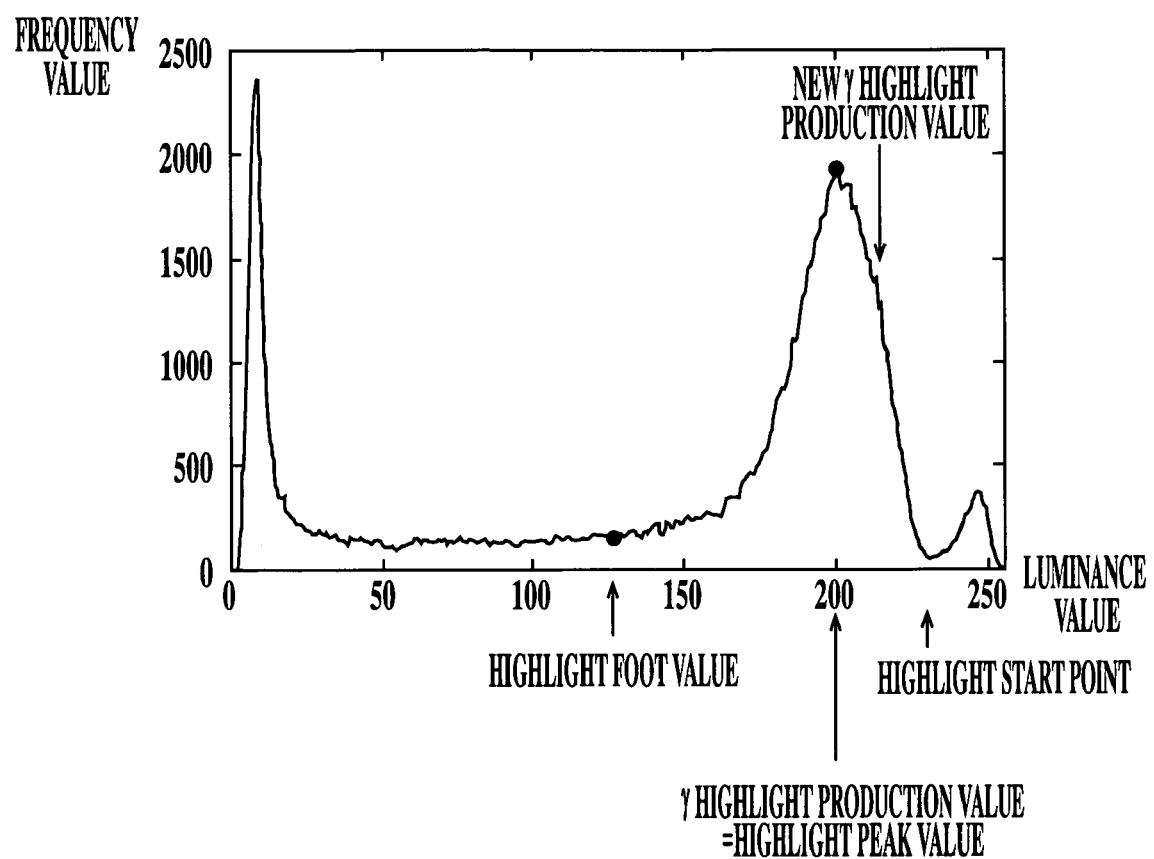
FIG. 11 is a view showing a histogram.

The histogram shown in FIG. 11 will be referred to while the γ highlight production value adjustment process is concretely described. In the histogram of FIG. 11, the γ highlight production value coincides with a γ highlight peak value. Moreover, because a γ highlight foot value and a γ highlight production value are distant from each other by a gradation possibility threshold value ("35") or longer, the CPU 10 stores a value obtained by shifting the highlight start point toward the value of "0" direction of the histogram by the gradation possibility threshold value into the highlight part storage area 308 as a new γ highlight production value (for example, a "new γ highlight production value" in FIG. 11).

As described above, according to the γ highlight production value adjustment process, when a gradation expression is included in the highlight part, the gradation expression in the highlight part can be properly expressed by adjusting the γ highlight production value.

[2.9 γ Reference Threshold Value Determination Process]

Next, the γ reference threshold value table determination process will be described. First, the CPU 10 reads the parameters concerning an image stored in the image data storage area 304 from the parameter storage area 302, and determines a γ reference threshold value. To put it concretely, the CPU 10 reads a "color/monochrome selection value" and a "kind of the image" from the parameter storage area 302, and thereby determines the γ reference threshold value table corresponding to image data. Then, the CPU 10 determines the γ reference threshold value corresponding to the density setting value among the determined γ reference threshold value table.

For example, FIG. 12A shows a state of an initial value set with the operation section 60. In the present embodiment, a "color mode" is selected, and "0" is selected as the density setting value. Accordingly, the CPU 10 uses the g reference threshold value table for color images (FIGS. 12B and 12C).

Next, the CPU 10 reads the parameter storage area 302 to ascertain whether the image data indicates a "photograph" or a "letter". For example, when the kind of the image read from the parameter storage area 302 is the "photograph", the CPU 10 selects the γ reference threshold value table in FIG. 12B. Moreover, because the density setting value is "0", the CPU 10 determines the graph having the density setting value "0" as γ reference threshold value in the selected γ reference threshold value table in FIG. 12B.

The use of the γ reference threshold value table brings about the following effects.

Because a γ curve for a gradation correction is produced from a conventional γ curve by an adjustment quantity selected from the γ reference threshold value table, a gradation reproduction matched to the selected original image mode and the selected color mode can be performed.

For example, when an original image quality is a letter mode, a γ curve for EE is produced from the γ curve to be used in the letter mode. Consequently, a gradation reproduction matched to an intention of a user can be performed.

The use of different γ reference threshold value table in a full color mode and a black-and-white mode makes it possible to produce a γ curve for a gradation correction which is more suitable for the color mode.

The change of a γ reference threshold value table makes it possible to change a gradation reproduction produced in a gradation correction freely, even if the original parameters are the same.

Enabling a user to select a γ reference threshold value table makes the degree of freedom of the γ curve for a gradation correction to the user high.

Even when originals severally have γ reference threshold value tables to be used for judgments of a letter and a photograph and have the same background level and the same shadow level, γ curves for a gradation correction matched to respective originals can be produced.

For example, even in case of a dark photograph image having a dark gray background, the background is not lightened and a γ curve for a gradation correction can be produced. Moreover, a dark photograph can be made to be brighter a little in some ranges of the γ curves selectable from the γ reference threshold value table.

As described above, according to the γ reference threshold value table determination process, a γ reference threshold value corresponding to the density set by a user and the kind of an image can be determined. For example, even in the case where a user sets the same density setting value, the CPU 10 sets a proper range of a lightness γ corresponding to the kind of a read image. For example, when a read image is judged to be a "photograph", even in the case where the density setting value is set to be "0", the range of the lightness γ is the range of from "+1" to "−2". When the read image is judged to be a "letter", the range of the lightness γ is the range of from "0" to "−4".

[2.10 γ Curve Production Process]

Next, the γ curve production process will be described. The execution of the γ curve production process by the CPU 10 realizes the function as a γ curve production section.

First, the CPU 10 reads a γ shadow production value from the shadow part storage area 306, and a γ highlight production value from the highlight part storage area 308. Next, the CPU 10 determines the shadow γ value and the highlight γ value on the basis of the γ reference threshold value determined by the γ reference threshold value table determination process. Next, the CPU 10 produces a γ curve on the basis of the determined shadow γ value and the highlight γ value.

Figure 13A:
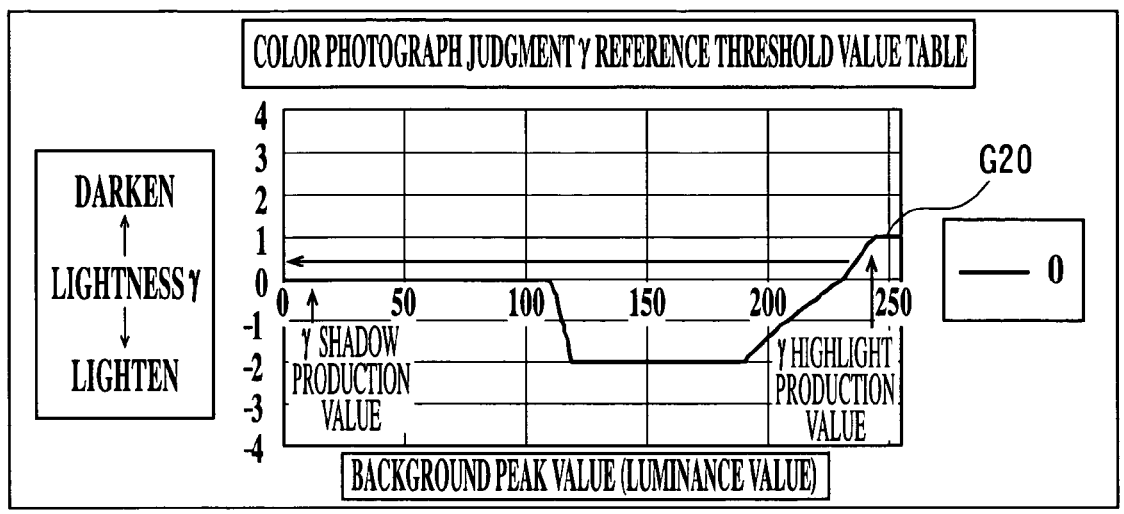
FIGS. 13A to 13C are views showing steps of a γ curve production process.
Figure 13B:
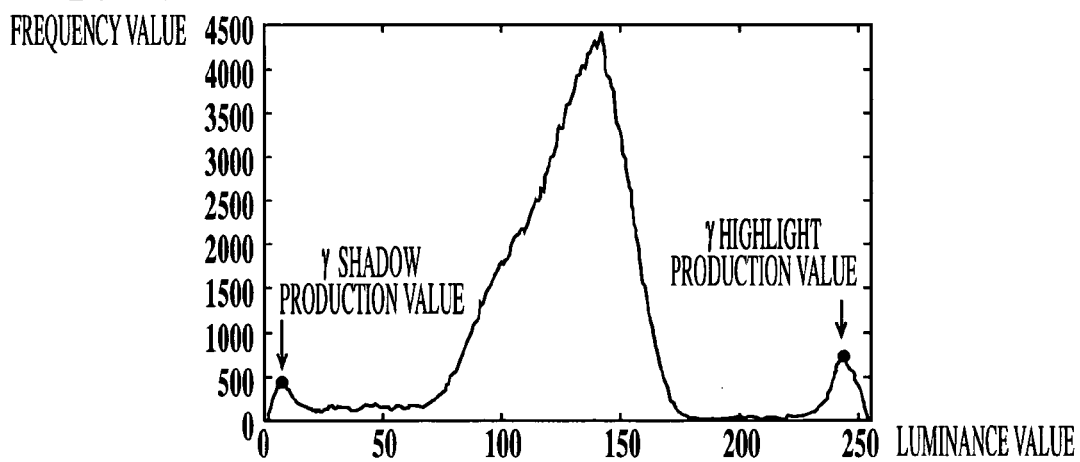
Figure 13C:
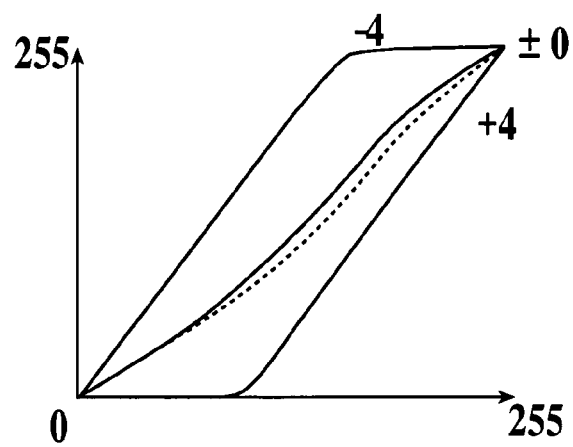

FIGS. 13A, 13B and 13C will be referred to while the γ curve production process is described. FIG. 13A is a view showing the γ reference threshold value determined at the step A24. FIG. 13B is a view showing a histogram corresponding to the image data stored in the image data storage area 304. In FIG. 13A, a γ reference threshold value table for a "color image/photograph" is selected, and a graph corresponding to the density setting value of "0" is selected as the γ reference threshold value.

First, the CPU 10 determines a shadow γ value. To put it concretely, the CPU 10 determines the lightness γ corresponding to the luminance value of the γ shadow production value from the graph G20 in FIG. 13A. Hereupon, the lightness γ corresponding to the γ shadow production value (for example, "15") is "0", and the CPU 10 stores "0" as the shadow γ value.

Next, the CPU 10 determines a highlight γ value. To put it concretely, the CPU 10 determines the lightness γ corresponding to the luminance value of the γ highlight production value from the graph G20 in FIG. 13A. Hereupon, the lightness γ corresponding to the γ highlight production value (for example, "240") is "0.5", and the CPU 10 stores "0.5" as the highlight γ value.

Then, the CPU 10 produces a γ curve on the basis of the determined shadow γ value and the highlight γ value. FIG. 13C is a view showing the γ curve produced by the CPU 10, and FIG. 13C shows the produced γ curve by means of a dotted line.

Figure 14A:
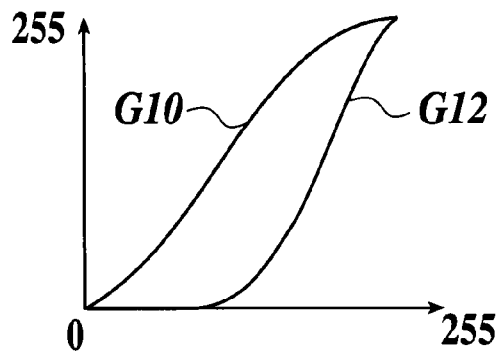
FIGS. 14A to 14E are views showing a concrete method for obtaining a γ curve in the γ curve production process.

Hereupon, FIGS. 14A-14E will be referred to while a procedure for produce a γ curve is described in detail. First, FIG. 14A is a view showing a part of a γ curve stored in the image processing apparatus 1 as an initial value. Hereupon, the γ curve G10 is a graph indicating that the γ value is "±0", and a γ curve G12 is a graph indicating that the γ value is "+4".

Figure 14D:
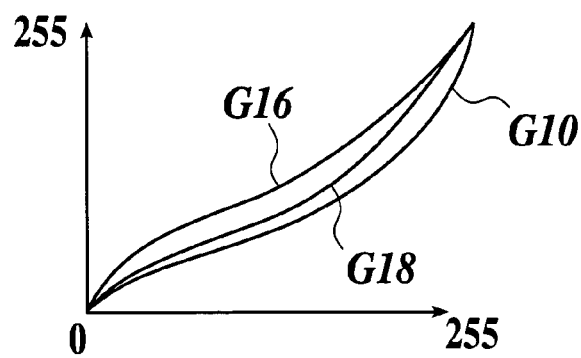
Figure 14B:
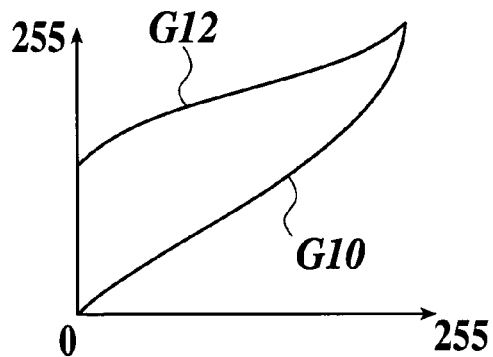

First, the CPU 10 replaces the abscissa axis of the γ curve with the ordinate axis thereof (FIG. 14B). Next, the CPU 10 produces a γ curve G16 in order that the γ curve G16 may be positioned at the center of a γ curve G14 having the γ value of "+1" and the γ curve G10 having the γ value of "±0".

Then, the CPU 10 produces the γ curve in order that the γ curve G16 may approach the state in which the γ value in the highlight part is "0.5" and the γ value in the shadow part is "±0".

Hereupon, an example of the procedure for producing the γ curve is shown. First, it is supposed that a value in the abscissa axis direction is denoted by a letter i and the values of a γ curve G18 are stored in an array out[i]. Similarly, it is supposed that the values of the γ curve G10 are stored in an array in1[i] and the values of the γ curve G16 are stored in an array in2[i]. Then, the γ curve G18 can be expressed by the following formula. That is:

$$out[i]=(i/255)\times in1[i]+(1-i/255)\times in2[i]$$

In this case, when i is changed from "0" to "255", the values of the curve G18 are calculated, and it is a γ curve G18 shown in FIG. 14D that expresses the γ curve.

Figure 14E:
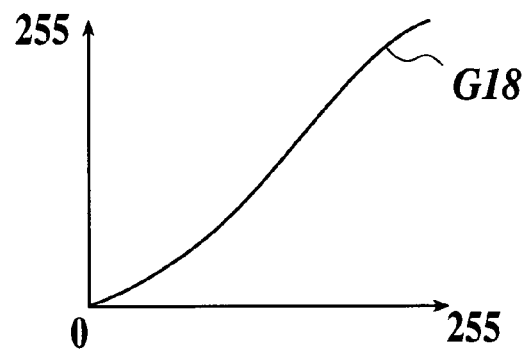
Figure 14C:
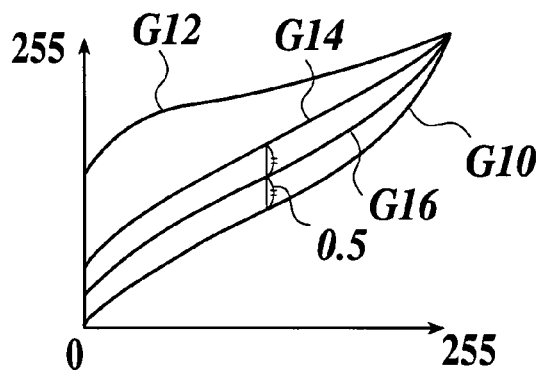

Then, a view showing a graph produced by replacing the ordinate axis of the γ curve and the abscissa axis thereof again is FIG. 14E. In such a way, the CPU 10 produces an arbitrary γ curve on the shadow γ value determined from the γ shadow production value and on the highlight γ value determined from the γ highlight production value.

Incidentally, the execution of the γ curve production section is not limited to the present embodiment. That is, the execution may be performed as a half tone γ curve production section for producing a γ curve on the basis of a predetermined parameter in place of the γ reference threshold value storage area 202. Moreover, the γ curve production section may produce a γ curve from, for example, the highlight peak value and the shadow peak value.

As described above, according to the γ curve production process, it is possible to produce a γ curve based on a shadow part and a highlight part. Consequently, an image process accommodated to the characteristic of an image more suitably can be enabled differently from the conventional uniform γ curve.

[2.11 Density Adjustment Process]

Lastly, the CPU 10 adjusts the density of the image data stored in the image data storage area 304 on the basis of the γ curve, and outputs the adjusted image data to the image output section 50 (step A28). The execution of the density adjustment process by the CPU 10 realizes the function as a density adjustment section. Because variously devised well know methods can be applied as the method of the adjustment of the density based on the γ curve, the description of the details of the method is omitted.

As described above, according to the automatic density adjustment process, it is possible to realize a density adjustment fitted to an image by judging the kind of a read image with a high degree of accuracy, and by producing an arbitrary γ curve.

No. Tokugan 2003-197114 filed on Jul. 15, 2003 including specification, claims, drawings and summary are incorporated herein by reference in its entirety.

What is claimed is:

1. An image processing apparatus comprising:

a histogram calculation section for calculating a histogram of an image;

a highlight part detection section for detecting a highlight part from the histogram;

a shadow part detection section for detecting a shadow part from the histogram;

a γ curve production section for producing a γ curve by using a highlight γ value corresponding to the highlight part and a shadow γ value corresponding to the shadow part; and a density adjustment section for performing a density adjustment of the image based on the γ curve produced by the γ curve production section; and a storage section for storing a correspondence relationship between γ values and luminance values;

wherein the γ curve production section reads the highlight γ value corresponding to a luminance value of the highlight part detected by the highlight part detection section, and the shadow γ value corresponding to a luminance value of the shadow part detected by the shadow part detection section, from the storage section; and wherein the γ curve production section produces a γ curve corresponding to the highlight part and a γ curve corresponding to the shadow part based on the two obtained γ values, and synthesizes the two γ curves with different weightings applied to the γ curve corresponding to the highlight part and the γ curve corresponding to the shadow part according to a luminance value at a time of synthesizing the two γ curves, so as to produce the γ curve based on which the density adjustment is performed by the density adjustment section.

2. The image processing apparatus of claim 1, wherein the luminance value of the highlight part is determined based on a number of crests, a highlight start point and a highlight foot value of the highlight part.

3. The image processing apparatus of claim 1, wherein the luminance value of the shadow part is determined based on a shadow peak value, a highlight peak value, a shadow start point and a shadow foot value of the shadow part.

4. The image processing apparatus of claim 1, further comprising:
a density value setting section for setting a density value,
wherein the storage section stores a plurality of correspondence relationships between the γ values and the luminance values, and the plurality of correspondence relationships correspond to density values; and
wherein the γ curve production section reads the highlight γ value and the shadow γ value from the storage section based on one of the correspondence relationships that corresponds to the density value set by the density value setting section among the correspondence relationships stored in the storage section.

5. The image processing apparatus of claim 1, further comprising:
a judgment section for detecting an intermediate part between the shadow part and the highlight part from the histogram calculated by the histogram calculation section to judge a kind of the image based on the detected intermediate part,
wherein the storage section stores a plurality of correspondence relationships between the γ values and the luminance values, and the plurality of correspondence relationships correspond to kinds of images; and
wherein the γ curve production section reads the highlight γ value and the shadow γ value from the storage section based on one of the correspondence relationships that corresponds to the kind of the image judged by the judgment section among the correspondence relationships stored in the storage section.

6. The image processing apparatus of claim 1, wherein the highlight part detection section comprises a highlight part specification information detection section for detecting highlight part specification information including at least a foot value and a peak value of a high luminance part of the histogram calculated by the histogram calculation section, and the highlight part detection section detects the highlight part based on the highlight part specification information.

7. The image processing apparatus of claim 1, wherein the shadow part detection section comprises a shadow part specification information detection section for detecting shadow part specification information including at least a foot value and a peak value of a low luminance part of the histogram calculated by the histogram calculation section, and the shadow part detection section detects the shadow part based on the shadow part specification information.

8. An image processing method comprising:
calculating a histogram of an image;
detecting a highlight part and a shadow part from the histogram;
obtaining a γ value corresponding to the highlight part and a γ value corresponding to the shadow part, based on results of the detecting of the highlight part and the shadow part, respectively;
producing a γ curve corresponding to the highlight part and a γ curve corresponding to the shadow part based on the two obtained γ values;
producing a γ curve by synthesizing the two γ curves with each other with different weightings applied to the γ curve corresponding to the highlight part and the γ curve corresponding to the shadow part according to a luminance value at the synthesizing of the two γ curves; and
performing a density adjustment of the image based on the produced γ curve.

9. An image forming apparatus comprising:
a section for reading an image to obtain image data;
a histogram calculation section for calculating a histogram of the image from the image data;
a highlight part detection section for detecting a highlight part from the histogram;
a shadow part detection section for detecting a shadow part from the histogram;
a γ curve production section for producing a γ curve by using a highlight γ value corresponding to the highlight part and a shadow γ value corresponding to the shadow part;
a density adjustment section for performing a density adjustment on the image data based on the γ curve produced by the γ curve production section;
an image formation section for performing image formation by using the image data on which the density adjustment is performed; and
a storage section for storing a correspondence relationship between γ values and luminance values;
wherein the γ curve production section reads the highlight γ value corresponding to a luminance value of the highlight part detected by the highlight part detection section, and the shadow γ value corresponding to a luminance value of the shadow part detected by the shadow part detection section, from the storage section; and
wherein the γ curve production section produces a γ curve corresponding to the highlight part and a γ curve corresponding to the shadow part based on the two obtained γ values, and synthesizes the two γ curves with different weightings applied to the γ curve corresponding to the highlight part and the γ curve corresponding to the shadow part according to a luminance value at a time of synthesizing the two γ curves, so as to produce the γ curve based on which the density adjustment is performed by the density adjustment section.

10. The image forming apparatus of claim 9, further comprising:
a judgment section to judge a kind of the image;
wherein the storage section stores a plurality of tables which have correspondence relationships between the γ values and the luminance values; and
wherein the γ curve production section refers to one of the tables that corresponds to the kind of the image judged by the judgment section among the plurality of tables, and reads the highlight γ value and the shadow γ value from the table.

11. The image forming apparatus of claim 9, further comprising:
a setting section to set a density value;
wherein the storage section stores a plurality of tables which have correspondence relationships between the γ values and the luminance values; and wherein the γ curve production section refers to one of the tables that corresponds to the density value set by the setting section among the plurality of tables and reads the highlight γ value and the shadow γ value from the table.

12. A computer-readable medium having a computer program stored thereon that is executable by a computer to cause the computer to execute a process comprising:
- calculating a histogram of an image;
- detecting a highlight part from the calculated histogram;
- detecting a shadow part from the calculated histogram;
- producing a γ value corresponding to the highlight part and and a γ value corresponding to the shadow part based on results of the detecting of the highlight part and the detecting of the shadow part, respectively;
- producing a γ curve corresponding to the highlight part and a γ curve corresponding to the shadow part based on the two obtained γ values;
- producing a γ curve by synthesizing the two γ curves with each other with different weightings applied to the γ curve corresponding to the highlight part and the γ curve corresponding to the shadow part according to a luminance value at the synthesizing of the two γ curves; and
- adjusting a density of the image based on the produced γ curve.

* * * * *